United States Patent
Liphardt et al.

(10) Patent No.: US 11,885,738 B1
(45) Date of Patent: Jan. 30, 2024

(54) REFLECTOMETER, SPECTROPHOTOMETER, ELLIPSOMETER OR POLARIMETER SYSTEM INCLUDING SAMPLE IMAGING SYSTEM THAT SIMULTANEOUSLY MEET THE SCHEIMPFLUG CONDITION AND OVERCOMES KEYSTONE ERROR

(71) Applicants: Martin M. Liphardt, Lincoln, NE (US); Galen L Pfeiffer, Roca, NE (US); Ping He, Lincoln, NE (US)

(72) Inventors: Martin M. Liphardt, Lincoln, NE (US); Galen L Pfeiffer, Roca, NE (US); Ping He, Lincoln, NE (US)

(73) Assignee: J.A. WOOLLAM CO., INC., Lincoln, NE (US)

( * ) Notice: Subject to any disclaimer, the term of this patent is extended or adjusted under 35 U.S.C. 154(b) by 196 days.

(21) Appl. No.: 16/873,259

(22) Filed: Mar. 9, 2020

Related U.S. Application Data

(63) Continuation-in-part of application No. 15/330,322, filed on Sep. 6, 2016, now Pat. No. 10,859,439, which is a continuation-in-part of application No. 13/815,625, filed on Mar. 13, 2013, now abandoned.

(60) Provisional application No. 61/849,178, filed on Jan. 22, 2013.

(51) Int. Cl.
  G01N 21/21 (2006.01)
  G01N 21/55 (2014.01)
  G01J 3/28 (2006.01)

(52) U.S. Cl.
  CPC .......... G01N 21/211 (2013.01); G01J 3/2823 (2013.01); G01N 21/55 (2013.01); G01N 2021/215 (2013.01)

(58) Field of Classification Search
  CPC . G01N 21/211; G01N 21/55; G01N 2021/215
  See application file for complete search history.

(56) References Cited

U.S. PATENT DOCUMENTS

| | | | |
|---|---|---|---|
| 756,347 A | 2/1904 | Schampflug | 355/77 |
| 2,380,210 A | 7/1945 | Bennett | 359/663 |
| 3,565,511 A | 2/1971 | Dilworth | 359/663 |

(Continued)

OTHER PUBLICATIONS

EDmond Scientific, Technical Note "Telecentric Lenses" p. 302, "Why use Telecentric Lenses".

(Continued)

*Primary Examiner* — Rufus L Phillips
(74) *Attorney, Agent, or Firm* — James D. Welch

(57) ABSTRACT

An imaging system, and method of its use, for viewing a sample surface at an inclined angle, preferably in functional combination with a sample investigating reflectometer, spectrophotometer, ellipsometer or polarimeter system; wherein the imaging system provides that a sample surface and multi-element imaging detector surface are oriented with respect to one another to meet the Scheimpflug condition, and wherein a telecentric lens system is simultaneously positioned between the sample surface and the input surface of the multi-element imaging detector such that an image of the sample surface produced by said multi-element imaging detector is both substantially in focus over the extent thereof, and such that substantially no keystone error is demonstrated in said image.

15 Claims, 8 Drawing Sheets

(56) References Cited

U.S. PATENT DOCUMENTS

| | | | | |
|---|---|---|---|---|
| 3,773,404 | A | 11/1973 | Moore | 359/785 |
| 4,126,386 | A | 11/1978 | Fritzler | 352/105 |
| 4,436,392 | A | 3/1984 | Vanderwerf | 353/38 |
| 4,436,393 | A | 3/1984 | Vanderwerf | 353/38 |
| 4,818,098 | A | 4/1989 | Kahn et al. | 353/122 |
| 4,895,445 | A | 1/1990 | Granger | 356/328 |
| 4,916,319 | A | 4/1990 | Telfair et al. | 250/461.1 |
| 4,969,734 | A | 11/1990 | Kahn et al. | 353/122 |
| 5,085,506 | A | 2/1992 | Kahn et al. | 353/122 |
| 5,181,108 | A | 1/1993 | Greene | 358/93 |
| 5,293,226 | A | 3/1994 | Yamamoto et al. | 348/780 |
| 5,300,942 | A | 4/1994 | Dolgoff | 345/32 |
| 5,477,332 | A * | 12/1995 | Stone | G01B 11/255 348/128 |
| 5,500,737 | A | 3/1996 | Donaldson et al. | 356/376 |
| 5,517,312 | A | 5/1996 | Finarov | 356/386 |
| 5,548,394 | A * | 8/1996 | Giles | G06K 9/00026 356/71 |
| 5,567,126 | A | 10/1996 | Meece et al. | 417/310 |
| 5,602,679 | A | 2/1997 | Dolgoff et al. | 359/640 |
| 5,625,495 | A | 4/1997 | Moskovich | 359/663 |
| 5,665,770 | A | 9/1997 | Terao et al. | 514/476 |
| 5,706,083 | A | 1/1998 | Lida et al. | 356/328 |
| 5,737,081 | A | 4/1998 | Freischlad | 356/360 |
| 5,764,356 | A | 6/1998 | Finarov | 356/381 |
| 5,874,455 | A | 2/1999 | Terao et al. | 514/381 |
| 5,900,982 | A | 5/1999 | Dolgoff et al. | 359/619 |
| 1,963,326 | A | 10/1999 | Masao | 356/630 |
| 6,012,816 | A | 1/2000 | Beiser | 353/122 |
| 6,246,067 | B1 | 6/2001 | Tullis | 250/559.3 |
| 6,271,972 | B1 | 8/2001 | Kedar et al. | 359/663 |
| 6,328,448 | B1 | 12/2001 | Beijer | 353/70 |
| 6,457,834 | B1 | 10/2002 | Cotton et al. | 353/122 |
| 6,509,559 | B1 | 1/2003 | Virich et al. | 250/237 |
| 6,536,907 | B1 | 3/2003 | Towner et al. | 353/121 |
| RE38,153 | E | 6/2003 | Finarov | 356/630 |
| 6,592,574 | B1 | 7/2003 | Shimmick et al. | 606/4 |
| 6,771,423 | B2 | 8/2004 | Geist | 359/630 |
| 6,871,958 | B2 | 3/2005 | Streid et al. | 353/37 |
| 6,971,577 | B2 | 12/2005 | Tsikos et al. | 235/462.01 |
| 6,978,935 | B2 | 12/2005 | Tsikos et al. | 235/462.01 |
| 6,978,936 | B2 | 12/2005 | Tsikos et al. | 235/462.01 |
| 6,988,660 | B2 | 1/2006 | Tsikos et al. | 235/464 |
| 6,988,661 | B2 | 1/2006 | Tsikos et al. | 235/462.01 |
| 6,991,165 | B2 | 1/2006 | Tsikos et al. | 235/462.01 |
| 6,991,166 | B2 | 1/2006 | Tsikos et al. | 235/462.01 |
| 6,997,386 | B2 | 2/2006 | Tsikos et al. | 235/462.01 |
| 7,012,669 | B2 | 3/2006 | Streid et al. | 353/98 |
| 7,028,899 | B2 | 4/2006 | Tsikos et al. | 235/462.01 |
| 7,035,017 | B2 | 4/2006 | Tadic-Galeb et al. | 359/663 |
| 7,059,524 | B2 | 6/2006 | Knowles et al. | 235/462.01 |
| 7,066,391 | B2 | 6/2006 | Tsikos et al. | 235/462.45 |
| 7,070,106 | B2 | 7/2006 | Knowles et al. | 235/462.14 |
| 7,072,027 | B2 | 7/2006 | Iwanaga | 355/72 |
| 7,075,097 | B2 | 7/2006 | Tobiason et al. | 250/559.27 |
| 7,075,662 | B2 | 7/2006 | Hallerman et al. | 356/604 |
| 7,084,978 | B1 * | 8/2006 | Liphardt | G01N 21/01 356/364 |
| 7,090,133 | B2 | 8/2006 | Zhu | 235/462.01 |
| 7,095,498 | B2 | 8/2006 | Horie | 356/369 |
| 7,107,092 | B2 | 9/2006 | Goldstein et al. | 600/476 |
| 7,130,456 | B2 | 10/2006 | Hillmann | 382/127 |
| 7,145,726 | B2 | 12/2006 | Geist | 359/630 |
| 7,173,270 | B1 | 2/2007 | Bruinsma et al. | 250/559.41 |
| 7,199,868 | B2 | 4/2007 | Maase et al. | 356/71 |
| 7,231,081 | B2 | 6/2007 | Snow et al. | 382/157 |
| 7,239,399 | B2 | 7/2007 | Duquette et al. | 356/614 |
| 7,284,868 | B2 | 10/2007 | Colpaert et al. | 353/97 |
| 7,303,132 | B2 | 12/2007 | Knowles et al. | 235/462.25 |
| 7,329,859 | B2 | 2/2008 | Mizutani et al. | 250/231.13 |
| 7,334,902 | B2 | 2/2008 | Streid et al. | 353/98 |
| RE40,225 | E | 4/2008 | Finarov | 356/630 |
| 7,384,158 | B2 | 6/2008 | Ramachandran et al. | 353/70 |
| 7,404,861 | B2 | 7/2008 | Prentice et al. | 118/713 |
| 7,423,726 | B2 | 9/2008 | Kosugi | 355/53 |
| 7,455,424 | B2 | 11/2008 | Maase et al. | 362/231 |
| 7,527,200 | B2 | 5/2009 | Tsikos et al. | 235/454 |
| 7,567,345 | B1 * | 7/2009 | Liphardt | G01N 21/211 356/364 |
| 7,581,681 | B2 | 9/2009 | Tsikos et al. | 235/462.42 |
| 7,584,893 | B2 | 9/2009 | Tsikos et al. | 235/462.42 |
| 7,616,328 | B2 | 11/2009 | Stern et al. | 356/623 |
| 7,634,128 | B2 | 12/2009 | Snow et al. | 382/151 |
| 7,653,428 | B2 | 1/2010 | Goldstein et al. | 600/476 |
| 7,670,006 | B2 | 3/2010 | Lieberman | 353/70 |
| 7,684,050 | B2 | 3/2010 | Matsumoto et al. | 356/514 |
| 7,688,347 | B2 | 3/2010 | Dolgoff | 348/44 |
| 7,719,670 | B2 | 5/2010 | Hackney et al. | 356/237.1 |
| 7,773,209 | B2 | 8/2010 | Hackney et al. | 356/237.1 |
| RE41,906 | E | 11/2010 | Finarov | 356/630 |
| 7,852,458 | B2 | 12/2010 | Kosugi | 355/52 |
| 7,872,751 | B2 | 1/2011 | Liphardt et al. | 356/364 |
| 7,891,812 | B2 | 2/2011 | Larichev et al. | 351/211 |
| 7,901,075 | B2 | 3/2011 | Rooney et al. | 351/206 |
| 7,994,485 | B2 | 8/2011 | Feke et al. | 250/458.1 |
| 8,013,966 | B2 | 9/2011 | Liphardt | 356/369 |
| 8,056,700 | B2 | 11/2011 | Malek et al. | 198/403 |
| 8,068,211 | B2 | 11/2011 | Kosugi | 355/53 |
| 8,107,052 | B2 | 1/2012 | Kosugi | 355/53 |
| 8,149,382 | B2 | 4/2012 | Hidaka et al. | 355/53 |
| 8,213,017 | B2 | 7/2012 | Wiki | 356/445 |
| 8,243,015 | B2 | 8/2012 | Lieberman | 345/156 |
| 8,243,285 | B2 | 8/2012 | Fishbaine | 356/603 |
| 8,262,646 | B2 | 9/2012 | Frey et al. | 606/4 |
| 8,286,780 | B2 | 10/2012 | Malek et al. | 198/403 |
| 8,320,645 | B2 | 11/2012 | Maase | 382/124 |
| 8,345,241 | B1 | 1/2013 | Liphardt | 356/369 |
| 2002/0039184 | A1 | 4/2002 | Sandusky | 356/369 |
| 2002/0093648 | A1 * | 7/2002 | Nikoonahad | G03F 7/70616 356/237.1 |
| 2005/0200846 | A1 * | 9/2005 | Hoenig | G01N 21/211 356/369 |
| 2007/0263226 | A1 * | 11/2007 | Kurtz | G01N 21/6458 356/492 |
| 2008/0068615 | A1 * | 3/2008 | Striemer | G01J 3/0208 356/504 |
| 2008/0117413 | A1 * | 5/2008 | Liphardt | G01N 21/47 356/73 |
| 2008/0221445 | A1 * | 9/2008 | Rollins | G01N 21/4795 600/428 |
| 2009/0103093 | A1 * | 4/2009 | Liphardt | G01N 21/211 356/369 |
| 2012/0257200 | A1 * | 10/2012 | Blasenheim | G02B 7/28 356/369 |
| 2013/0258336 | A1 * | 10/2013 | Ostermeyer | G01N 21/90 356/364 |

OTHER PUBLICATIONS

Keystone Effect, from wikipedia, http://en.wikipedia.org/wiki/keystone-effect.

Telecentric Lens, wikipedia https://en.wikipedia.org/wiki/Telecentric-Lens ?oldid=706396555.

Scheimpflug Principle, wikipedia https://en.wikipedia.org/wiki/scheimpflug_principle?oldid=720399170.

* cited by examiner

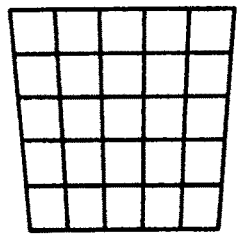 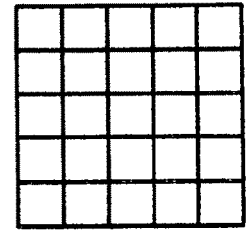
FIG. 5A  FIG. 5B
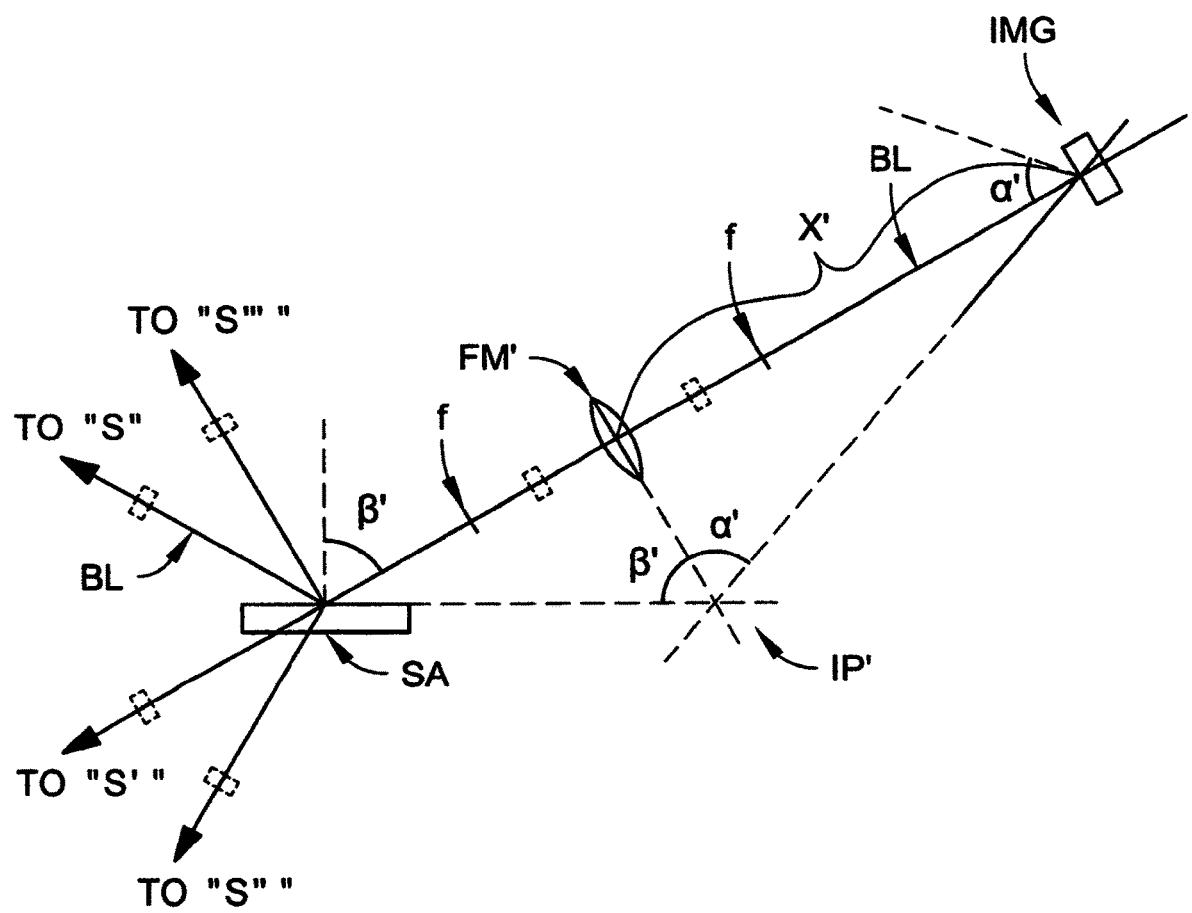
FIG. 6

US 11,885,738 B1

REFLECTOMETER, SPECTROPHOTOMETER, ELLIPSOMETER OR POLARIMETER SYSTEM INCLUDING SAMPLE IMAGING SYSTEM THAT SIMULTANEOUSLY MEET THE SCHEIMPFLUG CONDITION AND OVERCOMES KEYSTONE ERROR

This Application is a CIP of Allowed application Ser. No. 15/330,322 Filed Sep. 6, 2016, which is a CIP of application Ser. No. 13/815,625 Filed Mar. 13, 2013, and there via Claims Benefit of Provisional Ser. No. 61/849,178 Filed Jan. 1, 2013.

TECHNICAL FIELD

The present invention relates to reflectometers, spectrophotometers, ellipsometers and polarimeters, and more particularly to a reflectometer, spectrophotometer, ellipsometer or polarimeter system wherein an investigated sample surface is obliquely monitored by an imaging detector, a surface of which is oriented with respect to a sample surface so as to meet the Scheimpflug condition, and wherein a telecentric lens system, or a functionally afocal equivalent, is simultaneously positioned between said sample surface and the input surface of said imaging detector, such that an image of said sample surface produced by said imaging detector is both substantially in focus over an extent thereof, and such that substantially no keystone error is demonstrated in said image.

BACKGROUND

It is known to investigate monitored surfaces of samples using beams of electromagnetic radiation, as in reflectometry, ellipsometry, polarimetry and spectrophotometry. However, a problem exists when oblique angle monitoring of a sample surface is desirable. The problem is that it is difficult to maintain a focused image over an extent of said surface, and simultaneously compensate for Keystone error in said image.

It is known to orient sample surfaces and detector input surfaces so that the Scheimpflug condition is met to attain focus of a sample surface at said detector over an extent of said sample surface, (see Patent to Liphardt et al. U.S. Pat. No. 8,953,030 for instance, which concerns data acquisition, and which Issued after the Effective Priority Date of this Application). And it is known to apply Telecentric lens systems to compensate for Keystone error, (see Patent to Giles et al. U.S. Pat. No. 5,548,394 which teaches a fingerprint scanner that applies meeting the Scheimpflug condition and applies a Telecentric Lens to arrive at a system that provides the ability to scan a fingerprint and provide a true image thereof, in focus, and without varying magnification, Keystone varying effects). However, in the context of reflectometers, spectrophotometers, ellipsometers and polarimeters it is believed new, novel and non-obvious to simultaneously both meet the Scheimpflug condition by properly orienting sample and Imaging detector input surfaces with respect to one another, and to simultaneously apply a telecentric lens, or functionally equivalent afocal system, between said sample surface and detector surface to compensate Keystone error.

As a prosecution history exists with respect to application Ser. No. 13/815,625, which Application is under Appeal regarding Claims substantially equivalent Claims 1-12 herein, it is mentioned that the Giles 394 Patent, teaches a fingerprint scanner that applies Scheimpflug and the Telecentric Lens conditions to arrive at a system that provides the ability to scan a fingerprint and provide a true image thereof, in focus, and without varying magnification, Keystone varying effects. While Applicant considers this prior art relevant, it was not used in fashioning a rejection by the Examiner in the 625 Application. It is also noted that this reference does not hint at, let alone describe so as to obviate application in an ellipsometer etc. system, nor does it teach providing contrast enhancing polarizer and/or compensator in the path between a sample being imaged and an imaging detector. Additionally, nothing in said Giles et al. 394 Patent remotely suggests removal of the Prism (10) therein, (or other elements present therein but not in the present invention, eg. the scanning mirrors etc. in Giles et al. 394), which Prism (10) is applied in Giles et al. 394 to support a finger from which a finger print is being imaged in use, and replacement thereof with a stage in an ellipsometer etc. system, which stage supports a sample during an investigation thereof. There is absolutely nothing in Giles et al. 394 that would guide one skilled in the art and acting as a technician rather than an inventor, to remove said Prism (10) therein as the invention therein would not then function! And again, the Giles et al. 394 Patent does not remotely obviate placing a polarizer and/or compensator, as shown in the Original 625 Parent Application in FIG. 4, between a finger on a prism and imaging detector, nor does Giles et al. 394 provide any teachings as how to pick and choose elements disclosed therein, while rejecting others, and then modify and combine said selected elements to arrive at the present invention. One skilled in the art having Giles et al. 394 before him or her, (and other known references), would not remotely arrive at the present invention. He or she would not even find any hint that such should be done. To the extent that application of the Scheimpflug Condition and Telecentric Lensing is known from a reading of Giles et al. 394, there still remains no suggestion that such should be applied in a reflectometer, spectrophotometer, ellipsometer or polarimeter system. The Examiner in the Parent 625 Application cited a case identified as In re Keller 642F2d 413, 208 USPQ 871 (CCPA 1981) and applied a standard to the effect that if a prior art structure is capable of carrying out an intended function then it meets the Claim. Applied properly, if the prior art presents such structure as In re Keller requires, this is true. However, Attorney Welch expresses his opinion that the Examiner MUST Allow Claims to a new, novel, non-obvious and useful invention.

Continuing, a computer search for Patents that including the Terms "Scheimpflug and Reflectometer" has identified U.S. Pat. Nos. 7,872,751 and 7,567,345. And a similar computer search for Patents containing the terms "Telecentric and Reflectometer provided U.S. Pat. Nos. 8,160,351, 7,898,661, 7,859,659, 7,777,878, 7,719,677, 7,656,519, 7,477,372, 7,460,248, 7,190,460, 7,084,967, 7,075,637, 6,888,627, 6,862,090, 6,832,843, 6,636,302, 6,437,312, 6,370,422, 5,094,523 and 4,660,984. No overlap in said two searches is identified.

A search for Patents that including the Terms "Scheimpflug and Spectrophotometer" has identified U.S. Pat. No. 7,872,751, RE41,906, 7,653,428, RE40,225, 7,107,092, RE38,153, 5,874,455, 5,764,365, 5,665,770, 5,517,312 and 4,895,445. And, a search for Patent containing the terms "Telecentric and Spectrophotometer provided U.S. Pat. Nos. 8,218,152, 8,194,283, 8,189,170, 8,149,381, 8,008,642, 7,993,613, 7,957,067, 7,898,912, 7,897,912, 7,859,659, 7,800,014, 7,777,878, 7,723,662, 7,698,068, 7,697,111, 7,652,792, 7,583,386, 7,428,056, 7,408,649, 7,352,459, 7,336,354, 7,166,163, 7,113,281, 7,086,863, 6,922,236, 6,895,158, 6,850,371, 6,835,683, 6,832,824, 6,765,724, 6,672,109, 6,649,268, 6,687,262, 6,153,873, 6,108,083, 6,008,905, 5,812,419, 5,680,209 and 3,972,627. Again, there is no overlap in the identified searches.

A computer search for Patents including the Terms "Polarimeter and Telecentric" has identified U.S. Pat. Nos. 8,160,351, 7,777,878, 7,221,420, 7,079,247, 7,061,561, 7,038,776 and 6,927,888. A computer search for Patents including the Terms "Polarimeter and Scheimpflug" has identified U.S. Pat. No. 7,872,751 and 7,567,345. It is noted that there is no overlap in the two identified searches.

Similarly a computer search for Patents including the Terms "Ellipsometer and Telecentric" has identified U.S. Pat. Nos. 8,175,831, 8,111,376, 8,054,467, 7,898,661, 7,864,296, 7,859,659, 7,791,732, 7,777,878, 7,719,677, 7,636,168, 7,583,386, 7,428,056, 7,408,649, RE39,978, 7,221,420, 7,190,460, 7,151,609, 7,061,561, 6,879,380 6,862,090, 6,737,207, 6,592,574, 6,583,877, 6,525,806, 6,507,441, 6,493,097, 6,323,946, 6,177,990, 6,008,892, 5,917,594 and 5,646,733. Whereas a search for the Patents including the Terms "Ellipsometer and Scheimpflug" provided U.S. Pat. No. 7,872,751, RE41,906, 7,724,362, 7,567,345, RE40,225, RE38,153, 5,963,326, 5,764,365 and 5,517,312. Again, but for the U.S. Pat. No. 6,592,574, no overlap is identified in the two searches except for the U.S. Pat. No. 6,592,574, and this Patent does not suggest a combined Scheimpflug and telecentric system, but rather suggests using said systems separately in different embodiments of a system for laser sculpting of eye tissue.

In addition, Patents to Liphardt et al., U.S. Pat. Nos. 7,567,345, 7,872,751 and 8,013,966 are identified as they discuss the Scheimpflug condition referenced to a detector in a system that uses electromagnetic radiation to investigate a sample, that describe additional alignment or imaging systems above a sample in addition to sample investigating elements and that describe a spatial filter. Another Patent to Liphardt, U.S. Pat. No. 8,345,241 is identified as it mentions both the Scheimpflug condition, and Telecentric imaging in an ellipsometer system that includes a digital light processor. A Patent to Horie, U.S. Pat. No. 7,095,498 describes the presence of a pinhole mirror in a spectroscopic ellipsometer system. The pinhole mirror is rotated so that a beam of electromagnetic radiation is oriented along a locus which is oblique angle, rather than along a normal thereto. A Patent to Masao, U.S. Pat. No. 5,963,326 describes an imaging ellipsometer which uses a large cross-section measuring beam rather than a small beam spot as is the focus in the present invention. A Patent to Finarov, U.S. Pat. No. 5,517,312 mentions the Scheimpflug condition in the context of a scanning ellipsometer wherein a beam is scanned over a sample and a pattern recognition camera which is designed to utilize the Scheimpflug condition, is applied. Other known Patents are U.S. Pat. No. 751,347 to Scheimpflug, U.S. Pat. No. 2,380,210 to Bennett, U.S. Pat. No. 3,565,511 to Dilworth, U.S. Pat. No. 3,773,404 to Moore, U.S. Pat. No. 6,271,972 to Kedar et al., U.S. Pat. No. 6,246,067 to Tullis, and U.S. Pat. No. 5,625,495 to Moskovich. These Patents describe various aspects of the Scheimpflug Condition and Telecentric Lensing in other than the context of Ellipsometer etc. systems.

It is also noted that in prosecution of the parent application Ser. No. 13/815,625, the Examiner cited U.S. Pat. No. 7,084,978 to Liphardt, U.S. Pat. No. 5,706,083 to Iida et al. and Published Application 2002/0039184 by Sandusky. In that prosecution Applicant strongly argued that the Examiner had completely missed the focus of the present invention. Liphardt 978 Patent does not concern oblique Angle Imaging, and Iida 083 does not apply any telecentric lens in it's oblique angle Imaging system, (ie. Iida element Nos. 30 (lamp) and 31 (CCD Camera)), nor does it, or Liphardt 978, mention the Scheimpflug condition for achieving focusing in an imaging system over an area of a sample at an oblique angle in the area of ellipsometers and related systems.

Finally, two papers titled "Telecentric Lens" and "Scheimpflug Principle" are identified and included in the Information Disclosure which fairly concisely describe the indicated topics and were downloaded from Wikipedia.

In view of the foregoing, a need for a system selected from the group of reflectometer, ellipsometer, polarimeter and spectrophotometer, is therefore identified, which system simultaneously provides benefits inherent in meeting the Scheimpflug condition between a sample surface and a detector surface, simultaneous with applying a telecentric lens system or functionally equivalent afocal system, is identified.

DISCLOSURE OF THE INVENTION

The present invention is an oblique angle imaging system, consisting of:
 a) a source of illuminating electromagnetic radiation;
 b) a stage for supporting a sample placed thereupon;
said oblique angle imaging system source of illuminating electromagnetic radiation being oriented with respect to said stage for supporting a sample such that in use an illuminating beam of electromagnetic radiation is directed from said source toward said stage at an oblique angle to said stage;
 c) a telecentric lens system sequentially comprising:
  at least one lens;
  an aperture having a diameter; and
  at least one lens.
Said telecentric lens system is characterized in that at least one selection from the group consisting of:
 the entry pupil is substantially at infinity, where "pupil" refers to a selection from the group consisting of:
  object of an aperture; and
  image of an aperture;
and
 the exit pupil is substantially at infinity, where "pupil" refers to a selection from the group consisting of:
  object of an aperture; and
  image of an aperture.
The system further comprises:
 d) a multi-element imaging detector having an input surface.
Said stage and multi-element imaging detector are oriented with respect to one another with the surface of said sample placed on said stage and the input surface of said multi-element imaging detector meeting the Scheimpflug condition, and in conjunction with said telecentric lens system, which is simultaneously positioned between said sample surface and the input surface of said multi-element imaging detector results in an image of said sample surface produced by said multi-element imaging detector which is both substantially in focus, and demonstrates substantially no keystone error in said image.

Said oblique angle imaging system is characterized by the limiting combination of said sample surface and multi-element imaging detector surface being oriented to meet the Scheimpflug condition to effect focus of said sample, in combination with said telecentric lens between said sample surface and said imaging detector surface to substantially overcome keystone error.

The present invention is further an oblique angle imaging system, consisting of:
- a) a source of sample illuminating electromagnetic radiation;
- b) a stage for supporting a sample placed thereupon, upon which is present a sample having a surface;
- c) a telecentric lens system sequentially consisting of:
  at least one lens;
  an aperture having a diameter; and
  at least one lens.

Said telecentric lens system is characterized by:
the entry pupil is substantially at infinity, where "pupil" refers to a selection from the group consisting of:
object of an aperture; and
image of an aperture;
and
the exit pupil is substantially at infinity, where "pupil" refers to a selection from the group consisting of:
object of an aperture; and
image of an aperture.

The oblique angle imaging system also includes:
- d) a multi-element imaging detector having an input surface.

In use:
said oblique angle imaging system source of illuminating electromagnetic radiation being configured to direct a beam of electromagnetic radiation toward said sample;
said multi-element imaging detector being configured to receive electromagnetic radiation from said sample; and
said telecentric lens system being positioned between said sample surface and the input surface of said multi-element imaging detector;
said multi-element imaging detector producing an image of said sample surface which is both substantially in focus, and demonstrates substantially no keystone error.

Said oblique angle imaging system is distinguished by the presence of an additional element or combination of elements between said source of sample illuminating electromagnetic radiation said imaging detector, which additional element or combination of elements alters wavelength content of and/or intensity of and/or polarization state of the illuminating electromagnetic radiation provided by said source thereof.

The present invention is also further an oblique angle imaging system, consisting of:
- a) a source of sample illuminating electromagnetic radiation of a nature to provide illumination characterized by a selection from the group comprising:
  critical illumination;
  Koehler illumination; and
  dark field illumination;
  bright field illumination;
  cross-polarized illumination;
  phase contrast illumination;
- b) a stage for supporting a sample placed thereupon, upon which is present a sample having a surface;
- c) a telecentric lens system sequentially consisting of:
  at least one lens;
  an aperture having a diameter; and
  at least one lens;

said telecentric lens system being characterized by:
the entry pupil is substantially at infinity, where "pupil" refers to a selection from the group consisting of:
object of an aperture; and
image of an aperture;
and
the exit pupil is substantially at infinity, where "pupil" refers to a selection from the group consisting of:
object of an aperture; and
image of an aperture;
and
- d) a multi-element imaging detector having an input surface;

said oblique angle imaging system source of illuminating electromagnetic radiation being configured to direct a beam of electromagnetic radiation toward said sample;
said multi-element imaging detector being configured to receive electromagnetic radiation from said sample; and
said telecentric lens system being positioned between said sample surface and the input surface of said multi-element imaging detector;
said multi-element imaging detector producing an image of said sample surface which is both substantially in focus, and demonstrates substantially no keystone error.

Additionally, the present invention is a reflectometer, spectrophotometer, ellipsometer or polarimeter system comprising the oblique angle imaging system for viewing a sample.

Said reflectometer, spectrophotometer, ellipsometer or polarimeter system comprises:
a source of a sample investigating beam of electromagnetic radiation;
a stage for supporting a sample placed there upon, upon which is present a sample having a surface;
and
a detector.

And said oblique angle imaging system, consists of:
- a) a source of sample illuminating electromagnetic radiation;
- b) said stage for supporting a sample placed thereupon, upon which is present a sample having a surface;
- c) a telecentric lens system sequentially consisting of:
  at least one lens;
  an aperture having a diameter; and
  at least one lens;

said telecentric lens system being characterized by at least one selection from the group consisting of:
the entry pupil is substantially at infinity, where "pupil" refers to a selection from the group consisting of:
object of an aperture; and
image of an aperture;
and
the exit pupil is substantially at infinity, where "pupil" refers to a selection from the group consisting of:
object of an aperture; and
image of an aperture;
and
- d) a multi-element imaging detector having an input surface.

In use:
said oblique angle imaging system source of illuminating electromagnetic radiation being configured to direct a beam of electromagnetic radiation toward said stage for supporting a sample;
said multi-element imaging detector being configured to receive electromagnetic radiation from the surface of said sample; and
said telecentric lens system being positioned between said sample surface and the input surface of said multi-element imaging detector;

said multi-element imaging detector producing an image of said sample surface which is both substantially in focus, and demonstrates substantially no keystone error.

Said oblique angle imaging system can be further distinguished by the presence of an additional element or combination of elements between said source of sample illuminating electromagnetic radiation said imaging detector, which additional element or combination of elements alters wavelength content of and/or intensity of and/or polarization state of the illuminating electromagnetic radiation provided by said source thereof without altering the trajectory thereof.

It is also noted that the Source of Illumination (S) can be of a nature to provide illumination selected from the group consisting of:
Critical illumination;
Koehler illumination; and
Dark Field illumination;
Bright field illumination;
Cross-polarized illumination;
Phase contrast illumination.

As is readily available and understandable from the literature, the first three Sources involve illuminating a sample from atop thereof, as applied in reflection mode sample investigation. The later three illuminate a sample from beneath as applied in transmission mode sample investigation. Briefly, Critical illumination involves a focused image of a Source filament being present in the image of a sample. Koehler illumination avoids this by defocusing the image of the filament. Dark Field Sources block central light rays, and allow only oblique angle rays from a source to strike a sample. In the Bright Field approach a broad spectrum (white light) is applied to the back of a sample, and transmission therethrough results in an image that is darker where optical attenuation is higher, and vice-versa. The Crossed-polarizer approach provides illumination to the back of a sample, and also provides polarizers before and after the it. Depending on how the polarizers are oriented, various bi-refringent properties of the sample become observable which otherwise are not observable. The phase-contrast approach again illuminates a sample from the back thereof. The image formed is the result of how the sample changes both the amplitude and phase of the exiting electromagnetic radiation.

The present invention is more specifically a reflectometer, spectrophotometer, ellipsometer or polarimeter system comprising an oblique angle imaging system for viewing a sample.

Said reflectometer, spectrophotometer, ellipsometer or polarimeter system comprises:
a source of a sample investigating beam of electromagnetic radiation;
a stage for supporting a sample placed thereupon; and
a detector.

Said reflectometer, spectrophotometer, ellipsometer or polarimeter system source, stage and detector are, in use, oriented so that said source directs a sample investigating beam of electromagnetic radiation to a sample placed on said stage so that it impinges on a spot thereof, interacts therewith and enters said detector.

Said reflectometer, spectrophotometer, ellipsometer or polarimeter system can further comprise at least one selection from the group consisting of:
a polarizer/analyzer; and
a compensator;
between the sample and the imaging detector to enable effecting a polarization state in said sample imaging beam of electromagnetic radiation.

Said reflectometer, spectrophotometer, ellipsometer or polarimeter system can further comprise at least one selection from the group consisting of:
a polarizer/analyzer; and
a compensator;
between said source of a sample investigating beam of electromagnetic radiation and said detector thereof, to enable effecting a polarization state in said sample investigating beam of electromagnetic radiation.

Said reflectometer, spectrophotometer, ellipsometer or polarimeter system can provide that the source of illuminating electromagnetic radiation and the source of sample investigating electromagnetic radiation can be derived from a common source of electromagnetic radiation.

Said reflectometer, spectrophotometer, ellipsometer or polarimeter system for viewing a sample can provide that said aperture diameter is adjustable.

Said reflectometer, spectrophotometer, ellipsometer or polarimeter system for viewing a sample can provide that the oblique angle of said illuminating electromagnetic radiation is at, or near the Brewster angle for the sample being investigated.

A method of imaging and investigating a sample with electromagnetic radiation comprises the steps of:
a) providing a reflectometer, spectrophotometer, ellipsometer or polarimeter system also comprising an oblique angle imaging system for viewing a sample;
said reflectometer, spectrophotometer, ellipsometer or polarimeter system comprising:
a source of a sample investigating beam of electromagnetic radiation;
a stage for supporting a sample placed thereupon; and
a detector.

Said reflectometer, spectrophotometer, ellipsometer or polarimeter system source, stage and detector are oriented so that said source directs a sample investigating beam of electromagnetic radiation to a sample placed on said stage so that it impinges on a spot thereof, interacts therewith and enters said detector.

Further, said oblique angle imaging system, comprises:
a') a source of illuminating electromagnetic radiation;
b') said stage for supporting a sample placed thereupon;
said oblique angle imaging system source of illuminating electromagnetic radiation being oriented with respect to said stage for supporting a sample such that in use an illuminating beam of electromagnetic radiation is directed from said source toward said stage at an oblique angle to said stage.

The present invention system further consists of:
c') a telecentric lens system sequentially comprising:
at least one lens;
an aperture having a diameter; and
at least one lens;
said telecentric lens system being characterized in that at least one selection from the group consisting of:
the entry pupil is substantially at infinity, where "pupil" refers to a selection from the group consisting of:
object of an aperture; and
image of an aperture;
and
the exit pupil is substantially at infinity, where "pupil" refers to a selection from the group consisting of:
object of an aperture; and
image of an aperture.

And said system further comprises:
d') a multi-element imaging detector having an input surface.

Said stage and multi-element imaging detector are oriented with respect to one another with the surface of said sample placed on said stage and the input surface of said multi-element imaging detector meeting the Scheimpflug condition, and in conjunction with said telecentric lens system, which is simultaneously positioned between said sample surface and the input surface of said multi-element imaging detector results in an image of said sample surface produced by said multi-element imaging detector which is both substantially in focus, and demonstrates substantially no keystone error in said image.

Further, said source of illuminating electromagnetic radiation provides illuminating electromagnetic radiation to a spot on said sample upon said stage which is coincident with the location on said sample whereat said sample investigating beam of electromagnetic radiation impinges.

The oblique angle imaging system is characterized by the limiting combination of said sample surface and multi-element imaging detector surface being oriented to meet the Scheimpflug condition to effect focus of said sample, in combination with said telecentric lens between said sample surface and said imaging detector surface to substantially overcome keystone error.

Said method further comprises:
b) orienting said sample surface and multi-element imaging detector surface to meet the Scheimpflug condition and positioning said telecentric lens system between said sample surface and multi-element imaging detector surface so that, in an image of said sample surface when produced by said multi-element imaging detector, demonstrates substantially no keystone error and said image is substantially in focus over its entire extent;
c) causing said source of illuminating electromagnetic radiation to direct illuminating electromagnetic radiation to reflect from said sample surface, pass through said telecentric lens system and enter said multi-element imaging detector;
d) causing said multi-element imaging detector to produce an image of said sample surface that is substantially free of keystone error and is substantially in focus.

Said method can further comprise providing a computer and at least one selection from the group consisting of:
steps c) and d) are carried out under control thereof; and
the method includes storing at least some output provided by the multi-element imaging detector in a non-transitory machine readable media, and analyzing at least some output provided thereby;
applies.

Said method can further comprise that said computer receives data from said multi-element imaging detector and corrects it for image aspect ratio prior to display.

Said method can further provide that the system further comprises at least one selection from the group consisting of:
a polarizer/analyzer; and
a compensator;
between the sample and the imaging detector to enable effecting a polarization state in said sample imaging beam of electromagnetic radiation.

Said method can further provide that the system further comprises at least one selection from the group consisting of:
a polarizer/analyzer; and
a compensator;
between said source of a sample investigating beam of electromagnetic radiation and said detector thereof, to enable effecting a polarization state in said sample investigating beam of electromagnetic radiation.

As presented in the Parent 625 Application and included here for brevity, the present invention is an imaging system for viewing a sample at an inclined angle comprises:
a) a source of illuminating electromagnetic radiation;
b) an optional collimator;
c) a stage for supporting a sample placed thereupon;
d) a telecentric lens system; and
e) a multi-element imaging detector having an input surface.

The system is distinguished in that said stage and multi-element imaging detector are oriented with respect to one another such that the surface of said sample placed on said stage and the input surface of said detector meet the Scheimpflug condition, and said telecentric lens system is simultaneously positioned between said sample surface and the input surface of said multi-element imaging detector such that an image of said sample surface produced by said detector is both substantially in focus, and such that substantially no keystone error is demonstrated in said image.

Said imaging system for viewing a sample at an inclined angle an further comprises a computer for receiving data from said multi-element imaging detector and correcting it for image aspect ratio.

Said imaging system for viewing a sample at an inclined angle can further comprise at least one polarizer between said source of illuminating electromagnetic radiation and said multi-element imaging detector to enable effecting a polarization state in a beam of electromagnetic radiation produced by said source thereof, and can also further comprise at least one compensator between said source of illuminating electromagnetic radiation and said detector to further enable effecting a polarization state in a beam of electromagnetic radiation produced by said source thereof.

Said imaging system for viewing a sample at an inclined angle provides that said telecentric lens system can comprise, in sequence:
at least one lens;
an aperture having a diameter; and
at least one lens;
and said aperture diameter can be adjustable.

As a result of the present invention system configuration making space available, said system for viewing a sample at an inclined angle can further comprises a second imaging, or metrology system positioned substantially above said sample surface and between said source of a beam of electromagnetic radiation and said multi-element imaging detector having an input surface.

During use, illuminating electromagnetic radiation provided by that source thereof can approaches the sample surface along an oblique angle, which can be at, or near the Brewster angle for the sample being investigated.

A modified description provides that an imaging system for viewing a sample at an inclined angle, is in functional combination with a reflectometer, spectrophotometer, ellipsometer or polarimeter system.

In said modified imaging system for viewing a sample at an inclined angle, the imaging system comprises:
a) a source of illuminating electromagnetic radiation;
b) an optional collimator;
c) a stage for supporting a sample placed thereupon;
d) a telecentric lens system; and e) a multi-element imaging detector having an input surface.

As before, said stage and multi-element imaging detector are oriented with respect to one another such that the surface of said sample placed on said stage and the input surface of said multi-element imaging detector meet the Scheimpflug condition, and said telecentric lens system is simultaneously positioned between said sample surface and the input surface of said multi-element imaging detector such that an image of said sample surface produced by said multi-element imaging detector is both substantially in focus, and such that substantially no keystone error is demonstrated in said image. In use said source of illuminating electromagnetic radiation provides illumination to a spot on a sample placed on said stage for supporting a sample placed thereupon.

In said modified system, the reflectometer, spectrophotometer, ellipsometer or polarimeter system comprises:
 a source of a sample investigating beam of electromagnetic radiation;
 a stage for supporting a sample placed thereupon; and
 a detector.

In use, said reflectometer, spectrophotometer, ellipsometer or polarimeter system is oriented to provide a sample investigating beam of electromagnetic radiation to said sample placed on said stage for supporting a sample, so that it impinges on a spot thereof which is substantially coincident with illuminating electromagnetic radiation provided by said source of illuminating electromagnetic radiation.

It is noted that said source of illuminating electromagnetic radiation and said source of a sample investigating beam of electromagnetic radiation can both be derived from a single primary source via a beam splitter.

It is noted that addition of a polarizer between the source of a sample investigating beam of electromagnetic radiation and said stage for supporting a sample placed thereupon; and an analyzer between said stage for supporting a sample placed thereupon and said detector, respectively, provides an ellipsometer system. And further addition of a compensator between said source of a sample investigating beam of electromagnetic radiation and said detector enables operation as a polarimeter.

As before, said system can further comprise a computer for receiving data from said multi-element imaging detector and correcting it for image aspect ratio that arises because the sample surface is approached by the illuminating electromagnetic radiation at an inclined angle.

As before, said modified system can further comprise at least one polarizer and/or at least compensator between said source of illuminating electromagnetic radiation and said detector to enable effecting a polarization state in said illuminating electromagnetic radiation produced by said source thereof.

Again, as before, said modified system can provide that the telecentric lens system comprises, in sequence:
 at least one lens;
 an aperture having a diameter; and
 at least one lens;
and said aperture diameter can be adjustable.

And, again, as room therefore exists in the present invention system, said modified system for viewing a sample at an inclined angle can further comprise a second imaging, or metrology, system positioned substantially above said sample surface and between said source of a beam of electromagnetic radiation and said detector having an input surface.

During use, said system for viewing a sample at an inclined angle can again provide that illuminating electromagnetic radiation provided by source thereof approaches the sample surface along an oblique angle, which can be at, or near the Brewster angle for the sample being investigated.

A method of investigating a sample with an electromagnetic beam comprises the steps of:
 providing an imaging system for viewing a sample at an inclined angle comprising:
  a) a source of illuminating electromagnetic radiation;
  b) an optional collimator;
  c) a stage for supporting a sample placed thereupon;
  d) a telecentric lens system; and
  e) a multi-element imaging detector having an input surface.

Said stage and detector are oriented with respect to one another such that the surface of said sample placed on said stage and the input surface of said multi-element imaging detector meet the Scheimpflug condition, and said telecentric lens system is simultaneously positioned between said sample surface and the input surface of said multi-element imaging detector such that an image of said sample surface produced by said multi-element imaging detector is both substantially in focus, and such that substantially no keystone error is demonstrated in said image.

Said method then further comprises steps b), c) and d):
 b) orienting said sample surface and multi-element imaging detector surface to meet the Scheimpflug condition and positioning said telecentric lens system between said sample surface and multi-element imaging detector surface so that, in an image of said sample surface when produced by said multi-element imaging detector, demonstrates substantially no keystone error and said image is substantially in focus over its entire extent;
 c) causing said source of illuminating electromagnetic radiation to direct illuminating electromagnetic radiation to optionally interact with said collimator then proceed to reflect from said sample surface, pass through said telecentric lens system and enter said multi-element imaging detector;
 d) causing said multi-element detector to produce an image of said sample surface that is substantially free of keystone error and is substantially in focus.

Said method can also involve providing a reflectometer, spectrophotometer, ellipsometer or polarimeter system comprising:
 a source of a sample investigating beam of electromagnetic radiation;
 a stage for supporting a sample placed thereupon; and
 a detector of said sample investigating beam of electromagnetic radiation.

When so provided, the method further provides that steps e) and f) are further practiced, said steps e) and f) being;
 e) while, or after practicing steps c) and d) to provide an image of he sample, causing said source of a sample investigating beam of electromagnetic radiation to direct a sample investigating beam of electromagnetic radiation toward said sample such that it passes through said polarizer, impinges on said sample at a location substantially coincident with said illuminating electromagnetic radiation provided by said source of illuminating electromagnetic radiation, reflects therefrom, passes through said analyzer; and
 f) said detector of said sample investigating beam of electromagnetic radiation receiving the sample investigating electromagnetic radiation reflected from said sample, and producing sample characterizing data.

It is to be understood that the methodology can be carried out under the control of a computer and/or the methodology can include storing at least some output provided by the detector in a non-transitory machine readable media and analyzing at least some output provided by the detector.

With reference to FIGS. 1A-1D, (see Detailed Description for description), it is further disclosed that the present invention involves a camera system for monitoring a surface of a sample, in functional combination with a reflectometer, ellipsometer, polarimeter or the like system:
wherein said reflectometer, ellipsometer, polarimeter or the like system comprises:
 a) a source of a beam of electromagnetic radiation;
 c) a stage for supporting a sample;
 d) a detector;
such that in use said source of a beam of electromagnetic radiation causes a beam of electromagnetic radiation to interact with a sample placed on said stage and reflect into said detector, such that sample characterizing data is produced thereby;
and said camera system for monitoring the surface of said sample comprises:
 e) a camera sensor plate;
 f) a focusing means;
each of said camera sensor plate, focusing means and sample supporting stage each being oriented in identifiable planes, wherein:
 the plane of the camera sensor plate refers to the orientation of its surface;
 the plane of the sample supporting stage refers to the orientation of its surface; and
 the plane of the focusing means is perpendicular to its optical axis;
such that in use when said camera is positioned to observe a sample placed on said stage for supporting a sample along a camera viewpoint locus (VL), said camera viewpoint locus forms an angle alpha ($\propto$) with respect to the plane of said camera sensor plate, and proceeds from said camera sensor plate along a substantial perpendicular to the plane of said focusing means and along its optical axis, and such that said camera viewpoint locus further forms an oblique angle of incidence beta ($\beta$) with respect to a normal to a surface of said sample;
said camera sensor plate, focusing means and stage for supporting a sample being oriented with respect to one another such that a projected perpendicular to the plane of the camera sensor plate, a projected plane of the sample surface and a projected plane of the focusing means intersect at a common point, and such that the following condition is substantially met:

$$\text{Tan } (\propto) = (X-f)/f \text{ Tan } (\beta);$$

where "X" is the distance from the camera sensor plate, at the point at which said beam passes therethrough, to a center of said focusing means, and "f" is the focal length of said focusing means and where alpha ($\propto$) and beta ($\beta$) were defined above;
such that, in use the camera provides a focused view of the sample over the area thereof viewed, while ellipsometric or the like data is acquired at small angles-of-incidence.

Further, a method of viewing a sample surface in real time during investigation thereof by electromagnetic radiation, comprising the steps of:
 a) providing a system as just described; and b) adjusting the orientations of the plane of at least one of said camera sensor plate, sample surface and focusing means so that the Schiempflug condition is met thereby providing an in-focus view of the entire surface of said sample while it is being investigated by electromagnetic radiation.

Another recitation of a present invention sample imaging system for monitoring the surface of said sample during investigation thereof by a reflectometer, spectrophotometer, ellipsometer or polarimeter, while maintaining focus and compensating for Keystone effects provides for the reflectometer, ellipsometer, polarimeter or the like system to comprise:
 a) a source of a beam of electromagnetic radiation;
 c) a stage for supporting a sample;
 d) a detector;
such that in use said source of a beam of electromagnetic radiation causes a beam of electromagnetic radiation to interact with a sample placed on said stage and reflect into said detector, such that sample characterizing data is produced thereby;
and said sample imaging system for monitoring the surface of said sample comprises:
 e) a camera sensor plate;
 f) a focusing system.
Each of said camera sensor plate, focusing system and sample supporting stage each is oriented in identifiable planes, wherein:
 the plane of the camera sensor plate refers to the orientation of its surface;
 the plane of the sample supporting stage refers to the orientation of its surface; and
 the plane of the focusing system is perpendicular to its optical axis;
such that in use when said sample imaging is positioned to observe a sample placed on said stage for supporting a sample along a sample imaging viewpoint locus (VL), said sample imaging viewpoint locus forms an angle alpha ($\propto$) with respect to the plane of said camera sensor plate, and proceeds from said camera sensor plate along a substantial perpendicular to the plane of said focusing system and along its optical axis, and such that said sample imaging system viewpoint locus further forms an oblique angle of incidence beta ($\beta$) with respect to a normal to a surface of said sample.
said camera sensor plate, focusing means and stage for supporting a sample being oriented with respect to one another such that a projected perpendicular to the plane of the camera sensor plate, a projected plane of the sample surface and a projected plane of the focusing means intersect at a common point, and such that the following condition is substantially met:
where "X" is the distance from the camera sensor plate, at the point at which said beam passes therethrough, to a center of said focusing means, and "f" is the focal length of said focusing means and where alpha ($\propto$) and beta ($\beta$) were defined above;

In use the sample imaging system provides a focused view of the sample over the area thereof viewed, while ellipsometric or the like data is acquired at small angles-of-incidence.

Said sample imaging system is distinguished in that the focusing system is a selection from the group consisting of:
 a) a telecentric lens system sequentially comprising:
  at least one lens;
  an aperture having a diameter; and
  at least one lens;
 and b) two lenses which are separated by the sum of the focal lengths thereof.

The purpose of said system is to maintain focus over a large area of a sample surface and to compensate for Keystone effects.

A method of imaging a surface of a sample via a sample imaging system for monitoring the surface of said sample during investigation thereof by a reflectometer, spectrophotometer, ellipsometer or polarimeter, while maintaining focus and compensating for Keystone effects:
  a) providing a system as just described above; and
  b) adjusting the orientations of the plane of at least one of said camera sensor plate, sample surface and focusing system so that the Schiempflug condition is met thereby providing an in-focus view of the entire surface of said sample while it is being investigated by electromagnetic radiation, and such that Keystone effects are compensated.

The present invention will be better understood by reference to the Detailed Description Section, in conjunction with the Drawings.

BRIEF DESCRIPTION OF THE DRAWINGS

FIGS. 5A and 5B demonstrate the presence of, and absence of Keystone error.

FIG. 6 shows a sample (SAM) and a multi-element imaging detector (DET) oriented to meet the Scheimpflug condition.

DETAILED DESCRIPTION

Figures 1A, 1B:
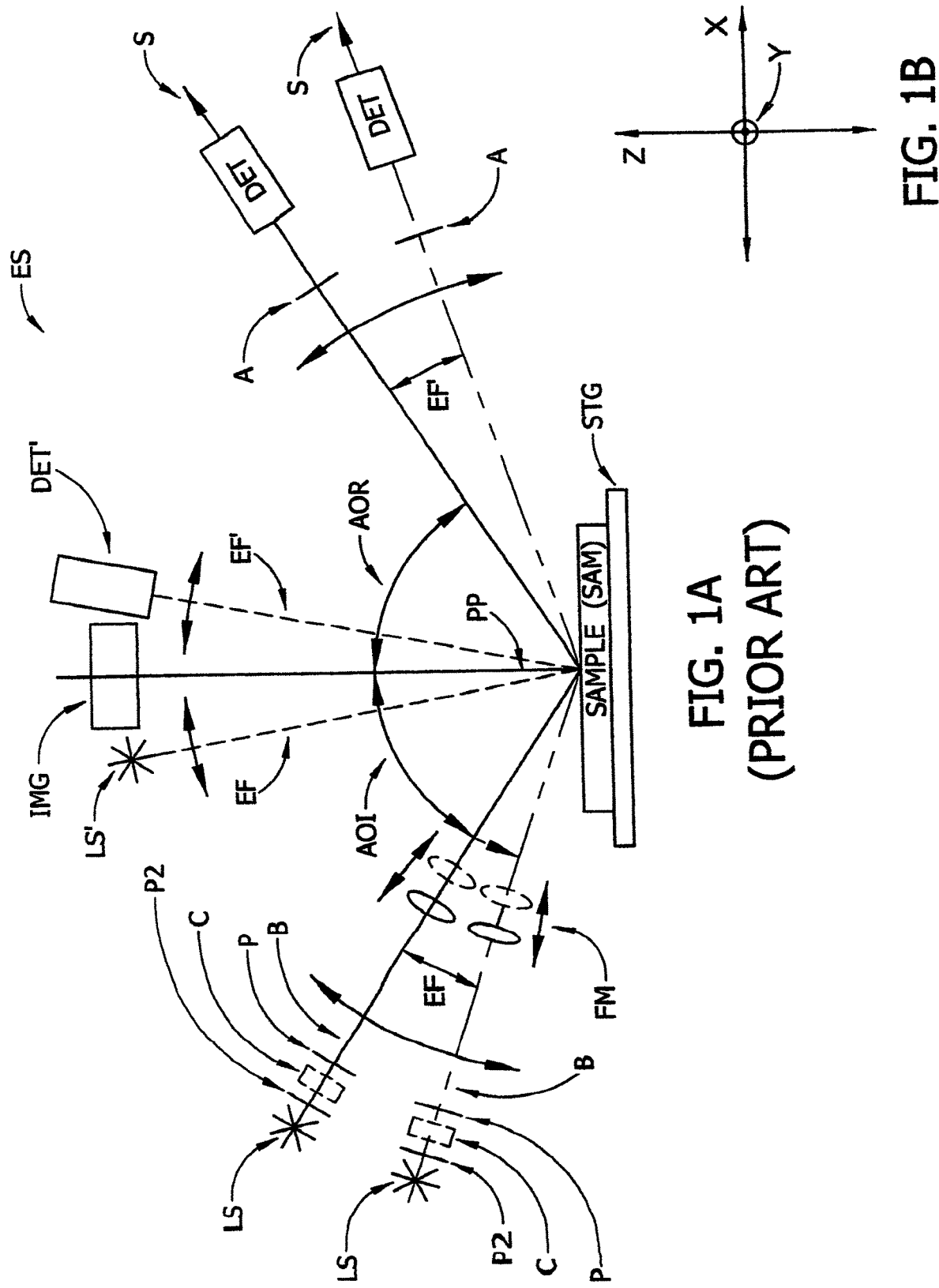
FIG. 1A shows an exemplary sample investigation system (ES) which uses an electromagnetic beam to investigate a sample (SAM) including conventional placement of a sample surface viewing camera (IMG).
FIG. 1B shows the "X", "Y" and "Z" axes that apply to FIG. 1A.

Turning now to FIG. 1A, there is shown, in the context of an indicated "X"-"Y"-"Z" axis system, (note the "Y" axis projects into the paper, the "Z" axis projects vertically and the "X" axis projects horizontally, as indicated in FIG. 1B), an exemplary Ellipsometer System (ES) oriented in an "X"-"Y" plane, and having a Source (LS) Electromagnetic Beam (B) and Detector (DET), each of which are mounted on Effective Arms (EA), that allow the (AOI) and (AOR) to be changed in a 29 manner. Also shown present is a Camera (IMG) removed from the Sample (SAM) along a perpendicular to its surface, (eg. along the "Z" axis), as is typical practice in order that the Camera (IMG) observe the Sample (SAM) surface in focus over its field of view. For insight, also shown are Ellipsometer elements including an Intensity Control Polarizer (P2), an Intensity Control Compensator (IMG), a Beam Polarizer (P), and Focusing Lens (FM) all functionally attached to said Effective Arm (EF), and an Analyzer (A) and Detector (DET) functionally attached to said Effective Arm (EF'). However, it is to be understood that the Present Invention can be practiced with no more than the Source (LS) functionally attached to Effective Arm (EF), a Sample (SAM) supporting stage, and a Detector (DET) functionally attached to Effective Arm (EF'), where only Beam Intensity change resulting from interaction with the Sample (SAM) is of interest.

Importantly, it should be apparent that the Effective Arm (EF) to which the Source (LS) of a Beam (B) of electromagnetic radiation is attached, as shown in FIG. 1A, can only rotate so far clockwise without it, or the Source (LS) bumping into the Camera (IMG), and that the Effective Arm (EF') to which the Detector (DET) is attached can only rotate so far counter-clockwise without it, or the Detector (DET'), bumping into the Camera (IMG). Present practice utilizing a Camera (IMG) therefore limits achieving very small EM Beam (B) Angles-of-Incidence (AOI) and Reflection (AOR). Utility would therefore be provided by positioning the Camera (IMG) otherwise than vertically above the Sample (SAM) as shown in FIG. 1A.

The present invention breaks with the FIG. 1A convention by placing the Camera (IMG) out of the way, (ie. so that the Camera (IMG) does not interfere with the clockwise and counter-clockwise motions of the respective Effective Arms (EA) (EA') that include the Source of an EM Beam (LS) and Detector (DET), respectively).

Figure 1C:
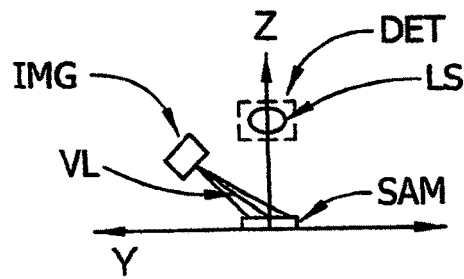
FIG. 1C demonstrates relative positioning of a camera (IMG) in the system of FIG. 1A which removes it from a position in which it interferes with movement of effective arms (EF) and (EF').

FIG. 1C shows the Present Invention positioning of the Camera (IMG) which can be thought of, for instance, as a location arrived at by moving the Camera (IMG) in a −Y direction into the paper "Y"-"Z" plane, to position the Camera (IMG) as shown in FIG. 2. However, this example is not limiting. It is important to realize that the Camera (IMG) can be placed essentially anywhere that allows it to have an oblique view of the Sample (SAM) surface being investigated by the Ellipsometer or the like EM Beam. FIG. 1C also identifies a Camera Viewpoint Locus (VL).

Figure 1D:
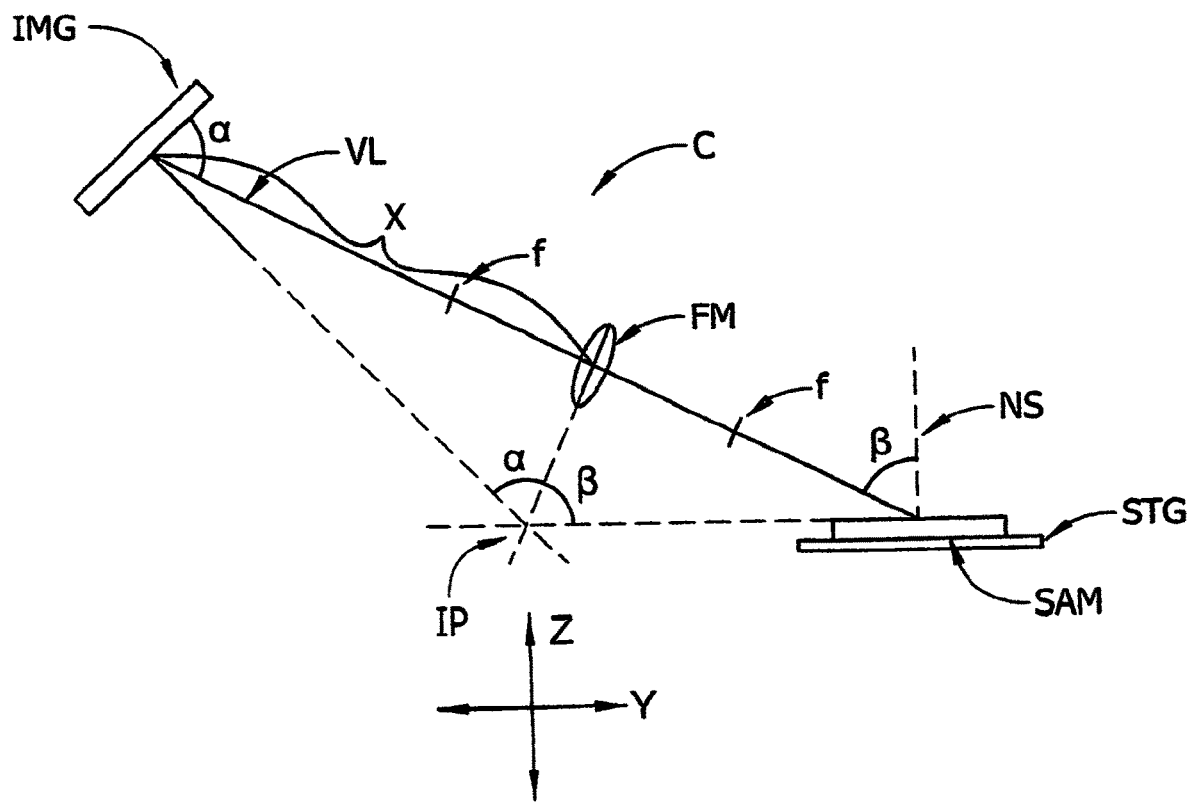
FIG. 1D shows the camera (IMG) positioned as in FIG. 1C, wherein a sensor plate and focusing means (FM), (eg. lens), and a sample (SAM) can be arranged to meet a mathematical relationship defined by the "Scheimpflug" condition.

FIG. 1D demonstrates the Scheimpflug condition applied to the Camera (IMG), which when met allows said Camera (IMG), when positioned, for instance, as demonstrated in FIG. 1C, to observe the entire viewed Sample (SAM) surface—in focus—, even though some portions of the Sample (SAM) are, from the Camera's viewpoint, closer thereto, and some portions of the Sample (SAM) are, from the Camera's viewpoint, further therefrom. FIG. 1D shows relative positioning and orientation of the Camera's viewpoint locus (VL), a Sample (SM) placed on the Ellipsometer or the like Stage (STG) for supporting a Sample, a Camera Sensor Plate (CS) and a Focusing Means (FM), (eg. lens), and indicates angels Alpha ($\alpha$) and Beta ($\beta$). When the identified elements are properly oriented with respect to one another, a mathematical relationship defined by the "Scheimpflug" condition results. In particular, Alpha ($\alpha$) is the angle between the Viewpoint Locus (VL) and the plane of the Camera Sensor Plate (CS), and Beta ($\beta$) is the oblique angle between said Viewpoint Locus (VL) and a normal to the plane of the Sample (SAM). The Equation shown is the defining equation for the Scheimpflug condition:

$$\text{Tan}(\alpha) = (X-f)/f \text{ Tan}(\beta);$$

where "X" is the distance from the camera sensor plate (CS), at the point at which said camera viewpoint locus (VL) passes therethrough, to a center of said focusing means, and "f" is the focal length of said focusing means. Again, Alpha ($\alpha$) is the angle between the plane of the Camera Sensor Plate (CS) and the Viewpoint Locus (VL), and Beta ($\beta$) is the oblique angle of incidence the beam makes with a normal (NS) to the Sample (SAM) surface. Note that projected planes of the Focusing Means (FM) and Sample (SAM), and a perpendicular to the Camera Sensor Plate (CS) intersect at Intersection Point (IP) when the Scheimpflug condition is met. When the various elements are oriented as described, the Camera (IMG) will have a focused view of the viewed area of the Sample (SAM) being viewed thereby.

It is application of the Scheimpflug condition to a Camera (IMG) viewpoint locus (VL) positioned, for instance, in the "Y"-"Z" plane, as shown in FIG. 1C, to allow a view of the entire surface of Sample (SAM) in focus, while allowing the associated Ellipsometer System (ES) to achieve the smallest (AOI) and (AOR) possible for the Ellipsometer System (ES) being applied, unaffected by Camera (IMG) presence imposed limitations, as indicated by FIG. 1A, which is the focal point of the present invention.

Again, as it is important, the FIG. 1C demonstration of the positioning of the Camera (IMG) is not limiting. The Camera can be positioned essentially anywhere other than directly above the Sample (SAM) where it does not interfer with movement of the Effective Arms (EF) (EF'), but also allows the Camera (IMG) an oblique view of the Sample (SAM) surface being investigated by the EM Beam (B). Of course the various elements of the system will then require appropriate relative orientations for different Camera (IMG) positioning, to satisfy the Scheimpflug condition.

It is noted that, the FIG. 1D Camera (IMG) and Focusing Means (FM) are not shown as encompassed within a camera housing, while not absolutely necessary, it is common practice that they are so housed.

Figure 1E:
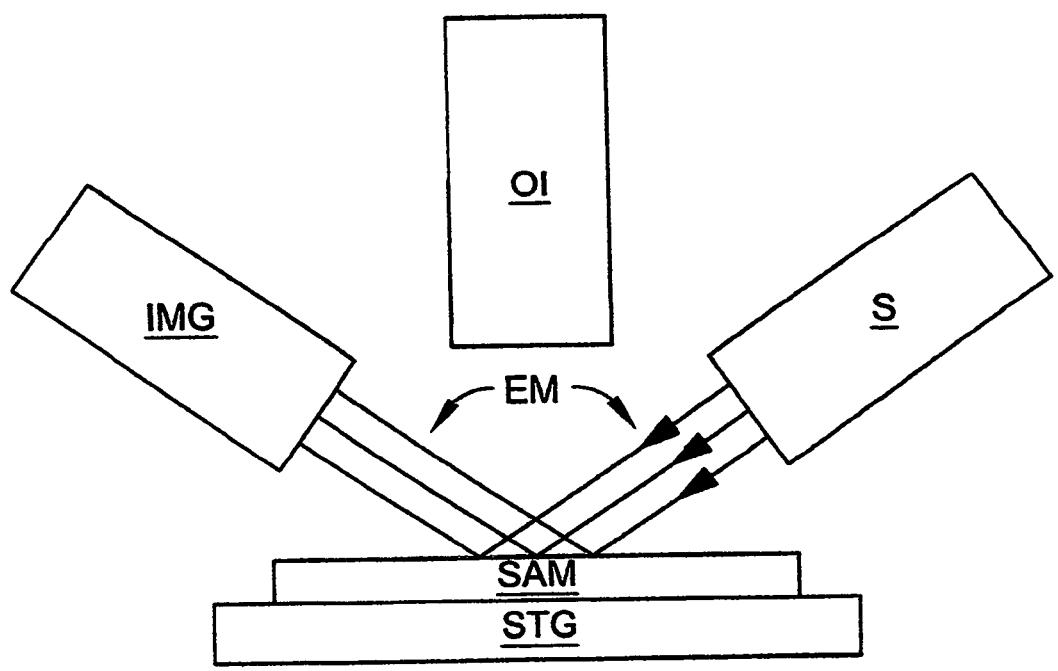
FIG. 1E shows a general system for illuminating the surface of a sample (SAM) with illuminating electromagnetic radiation (EM) provided by a source (S) thereof.

Continuing, there is shown in FIG. 1E a general system for illuminating the surface of a sample (SAM) with illuminating electromagnetic radiation (EM) provided by a source (S) thereof. Note that the illuminating electromagnetic radiation (EM) reflects from said surface of the sample (SAM) and into a imaging system (IMG) that typically is a multi-element imaging detector. Note that a conventional location for an Imaging Camera (O1) is included to distinctly show the difference in positioning between conventional practice (Camera O1) and positioning in the present invention practice (Imaging Means (IMG)).

Figure 2A:
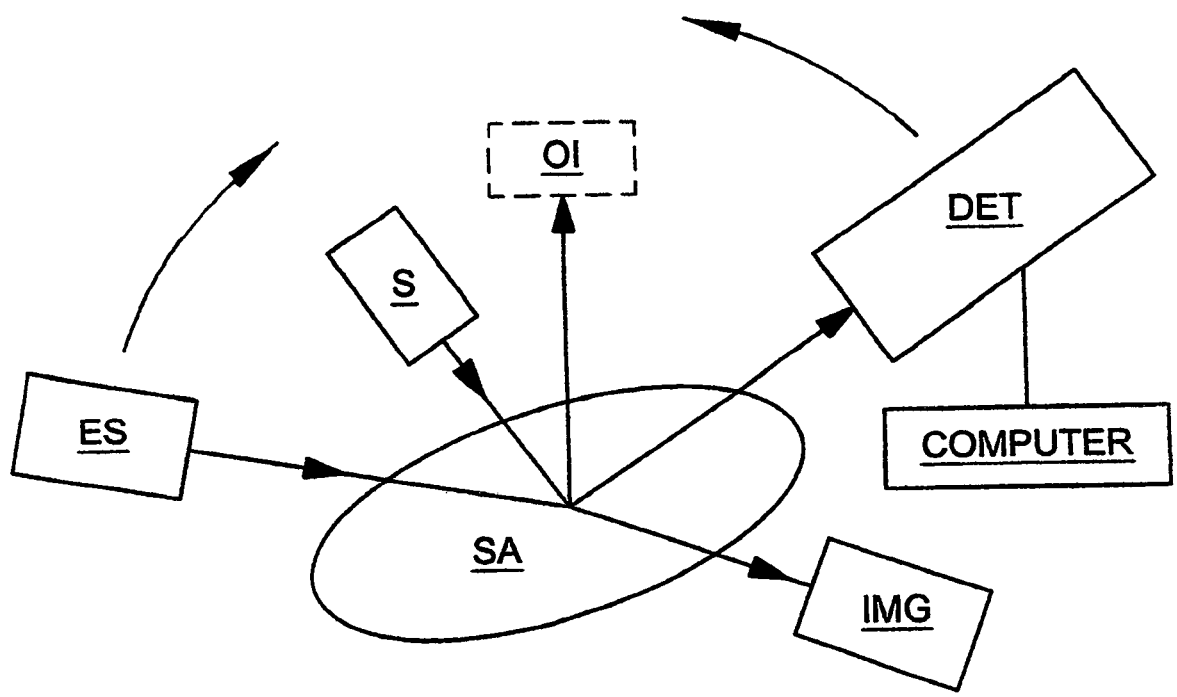
FIG. 2A shows the system of FIG. 1A, with, and additionally the presence of a reflectometer, spectrophotometer, ellipsometer or polarimeter system having a source (ES) of a beam of sample investigating electromagnetic radiation, and a detector (DET) thereof.

FIG. 2A shows an additional view of the FIG. 1E system for illuminating a sample surface, along with the addition of a reflectometer, spectrophotometer, ellipsometer or polarimeter system having a source (ES) of a beam of sample investigating electromagnetic radiation and a detector (DET) thereof. Also note that the Camera (O1) directly above the sample (SAM) is shown in dashed lines to indicate it is optional. When space is available it can be used for additional metrology or imaging even when the shown reflectometer, spectrophotometer, ellipsometer or polarimeter system is present. However, present invention practice does not require the Camera O1) be present. A non-distorted view of the Sample (SAM) can be achieved using only Imaging Device (IMG). Also shown is a COMPUTER for analysis/control.

Figure 2B:
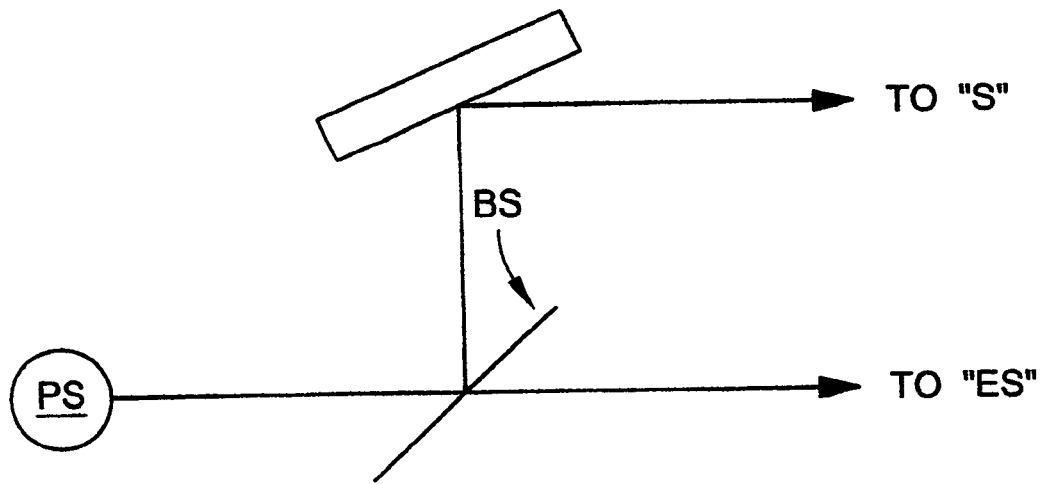
FIG. 2B shows that the source (S) of illuminating electromagnetic radiation (EM) and the source (ES) of a beam of sample investigating electromagnetic radiation, can be derived from a single primary source (PS) of electromagnetic radiation, via a beam splitter (BS).

FIG. 2B is included to show that the source (S) of illuminating electromagnetic radiation (EM) and the source (ES) of a beam of sample investigating electromagnetic radiation, can both be derived from a single primary source (PS) of electromagnetic radiation, via a beam splitter (BS).

Figure 3:
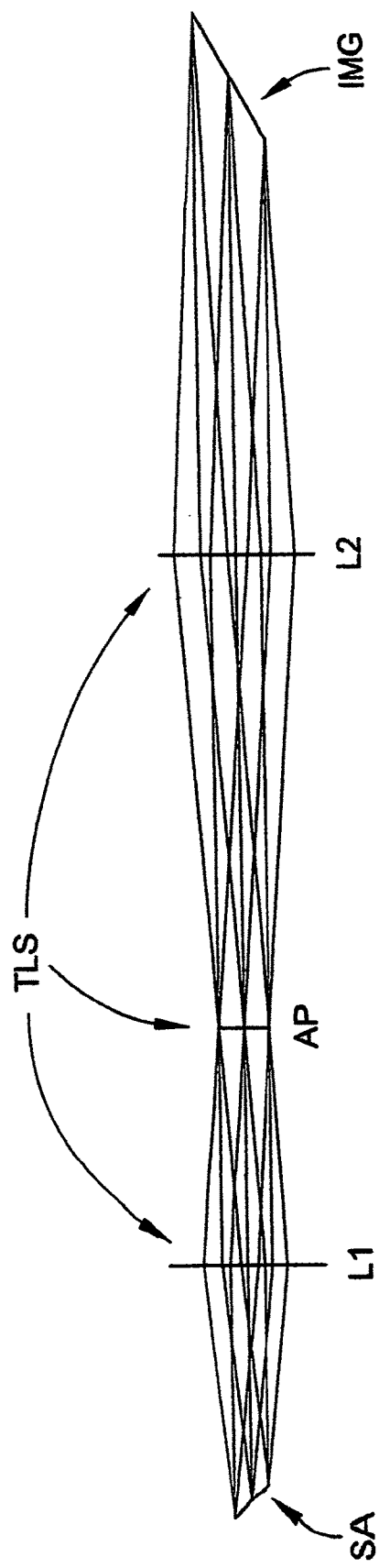
FIGS. 3 and 4 provides a schematic presentation of an imaging system (IMG), with a multi-element imaging detector (DET) and sample (SA) oriented to so that the surface of the sample (SA) and the surface of the multi-element imaging detector (DET) meet the Scheimpflug condition.

FIG. 3 provides a schematic presentation of an imaging system (IMG), with a multi-element imaging detector (DET) and sample (SAM) oriented to so that the surface of the sample (SAM) and the surface of the multi-element imaging detector (DET) meet the Scheimpflug condition. In addition, a Telecentric lens system (TLS) comprised of two lenses (L1) (L2) with an aperture (AP). therebetween is present between the source (S) and detector (DET). Note the sample (SAM) is shown at an angle to normal, as is the detector (DET). This arrangement is what serves to meet the Scheimpflug condition and provides an image of the sample (SAM) to the multi-element imaging detector (DET) that is in focus over the surface extent of said sample (SAM). It is to be appreciated that the imaging system (IMG) of FIG. 2A corresponds to the more detailed presentation of its components in FIG. 3. Also note that if the sample (SAM) in FIG. 3 were oriented to project in a horizontal plane, then the detector (DET) would be projected at an oblique angle thereto, as in FIG. 2A. The imaging system (IMG) of FIG. 2A should be understood to be comprised of the sequential telecentric lens system (TLS) elements and the detector (DET). (It is noted that telecentric lens system is characterized in that the entry and/or exit pupil is at infinity, where "pupil" refers to the object and/or image of an aperture).

Figure 4:
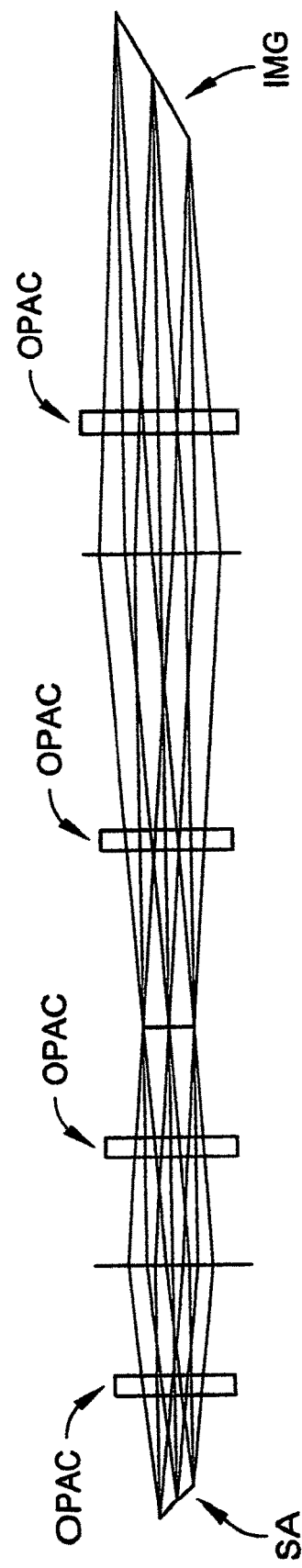

FIG. 4 is included as it indicates that at least one optional Polarizer/Analyzer (OPAC) can be present at a location between the source (S) and detector (DET). Further, at least one Compensator (OPAC) could also be present at any of the shown locations. When present said Polarizer/Analyzer or Compensator serve to impose a polarization state on the illuminating electromagnetic radiation, which in certain circumstances can serve to improve the image of the sample surface provided by the detector (IMG).

Note that it is the meeting of the Scheimpflug condition that effects the in-focus image of the sample (SAM) surface at the multi-element imaging detector (DET) surface, and it is the presence of the telecentric lens system (TLS), or functionally equivalent that overcomes what is known as the "Keystone" error as demonstrated by FIGS. 5A and 5B.

FIG. 5A includes distortion of a grid that constitutes the Keystone error. FIG. 5B shows that the telecentric lens system (TLS) eliminates distortion.

FIG. 6 shows a sample surface (SAM) and a multi-element imaging detector (IMG) surface oriented to meet the Scheimpflug condition which requires:

$$\text{Tan}(\alpha) = (X'-f)/f \text{ Tan}(\beta);$$

where (X'), (f), ($\alpha$) and ($\beta$) are shown.

Figure 10:
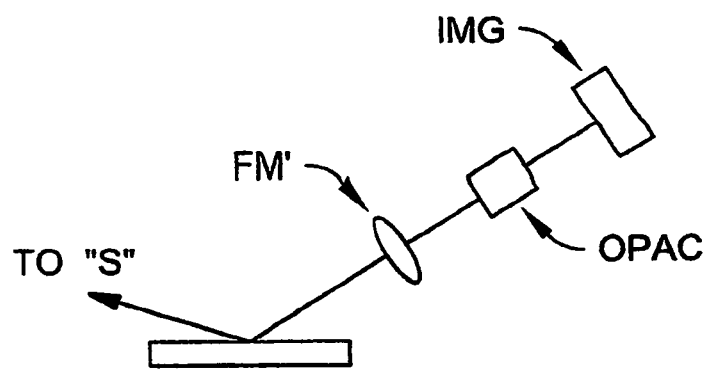
FIG. 10 is included to show that a Compensator and/or Polarizer and/or Analyzer can be placed between the Sample (SAM) and the Imaging Detector (IMG) in FIG. 6.

It is also to be appreciated that additional elements can optionally be present between the Source (S) and Sample (SA), and/or between the Sample (SA) and Focusing Means (FM') and/or between the Focusing Means (FM') and the Imaging Detector (IMG), and remain within the scope of the present invention. That is said oblique angle imaging system can be distinguished by the presence of an additional element or combination of elements anywhere between said source of sample illuminating electromagnetic radiation said imaging detector, which additional element or combination of elements alters wavelength content of and/or intensity of and/or polarization state etc. of the illuminating electromagnetic radiation provided by said source thereof. The dashed boxes in FIG. 6 are included to indicate the optional presence of additional components. FIG. 10 also indicates the possible presence of an additional component between the Sample (SA) and Imaging Detector (IMG).

It is also noted that the Source of Illumination (S) can be of a nature to provide illumination selected from the group consisting of:
Critical illumination;
Koehler illumination; and
Dark Field illumination;
Bright field illumination;
Cross-polarized illumination;
Phase contrast illumination.

As is readily available and understandable from the literature, the first three Sources involve illuminating a sample from atop thereof, as applied in reflection mode sample investigation. The later three illuminate a sample from beneath as applied in transmission mode sample investigation. Briefly, Critical illumination involves a focused image of a Source filament being present in the image of a sample. Koehler illumination avoids this by defocusing the image of the filament. Dark Field Sources block central light rays, and allow only oblique angle rays from a source to strike a sample. In the Bright Field approach a broad spectrum (white light) is applied to the back of a sample, and transmission therethrough results in an image that is darker where optical attenuation is higher, and vice-versa. The Crossed-polarizer approach provides illumination to the back of a sample, and also provides polarizers before and after the it. Depending on how the polarizers are oriented, various bi-refringent properties of the sample become observable which otherwise are not observable. The phase-contrast approach again illuminates a sample from the back thereof. The image formed is the result of how the sample changes both the amplitude and phase of the exiting electromagnetic radiation.

Also, as regards FIG. 6, it is to be understood that any Source (S) which can provide electromagnetic radiation eminating from the surface of the Sample (S) being imaged is within the scope of the invention. In particular, there is no need for the angle of incidence of the Source (S) Beam (BL) to be at and angle equal to Beta ($\beta$), as shown, when illumination is from above the Sample (S). Nor must it provide electromagnetic radiation from directly below the Sample (S) when the illumination is from below the Sample (S). Any Source positioning and orientation which works is acceptable. In particular exemplary positioning of Sources (S) (S') and (S") are shown which direct illuminating electromagnetic radiation toward the Sample (SA).

Figure 7:
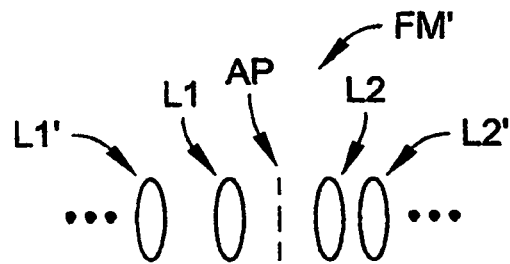
FIG. 7 is included to show that the Focusing Means (FM') in FIG. 6 can comprise multiple lenses (L1) (L1') (L2) (L2') on either side of the Aperture (AP).

FIG. 7 is included to show that the Focusing Means (FM') in FIG. 6 can comprise multiple lenses (L1) (L1') (L2) (L2') on either side of the Aperture (AP).

Figure 8:
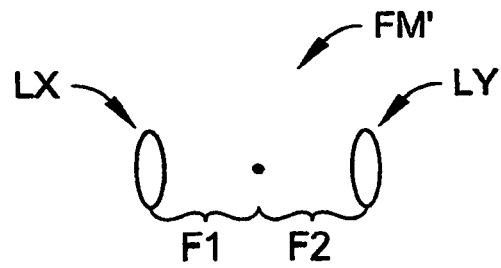
FIG. 8 is included to show that the Focusing Means (FM') in FIG. 6 can comprise two Lenses (Lx) (Ly) which are separated by the sum of their focal lengths (F1) and (F2).

FIG. 8 is included to show that the Focusing Means (FM') in FIG. 6 can comprise two Lenses (Lx) (Ly) which are separated by the sum of their focal lengths (F1) and (F2).

Figure 9:
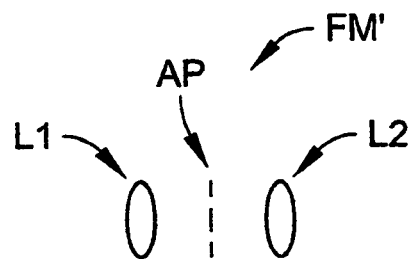
FIG. 9 is included to show that the typical configuration of the Focusing Means (FM') sequentially comprises a Lens (L1), and Aperture (AP) and another Lens (L2)

FIG. 9 is included to show that the typical configuration of the Focusing Means (FM') sequentially comprises a Lens (L1), and Aperture (AP) and another Lens (L2), without an Aperure (AP) present as shown in FIGS. 3 and 4.

FIG. 10 is included to show that a Compensator and/or Polarizer and/or Analyzer can be placed between the Sample (SAM) and the Imaging Detector (IMG) in FIG. 6, much as shown in FIG. 4.

Figure 11A:
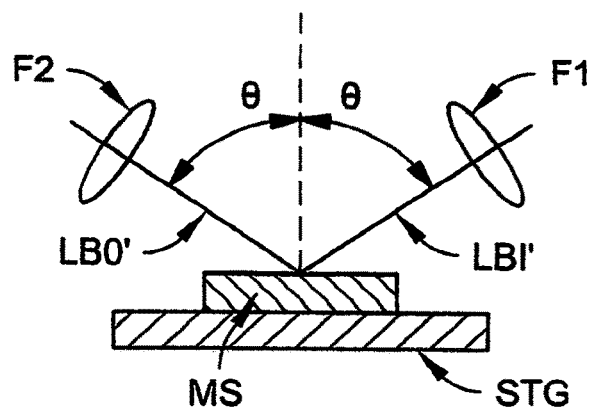
FIGS. 11A, 11B and 11C are also included to show how an appropriately shaped Hole in an Aperture can provide a circular shaped spot on a Sample (MS) resting on a Stage (STG).
Figure 11B:
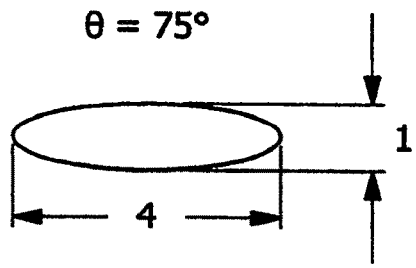
Figure 11C:
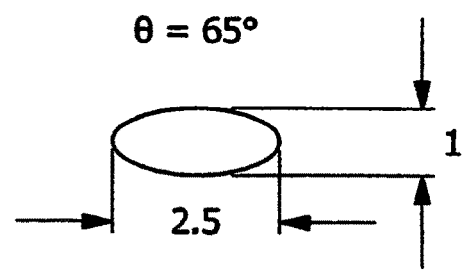

FIGS. 11A, 11B and 11C are also included to show how an appropriately shaped Hole in an Aperture can provide a circular shaped spot on a Sample (MS) resting on a Stage (STG). Note FIG. 11A shows an Input Beam of electromagnetic radiation (LBI') reflecting as (LBO') from the Sample (MS). FIG. 3B shows that an Aperture with an aspect ratio other than 1.0 can be placed in the Input Beam (LBI') prior to the Sample (MS). FIG. 3B shows that for an Angle-of-Incidence (0) of 75 Degrees, an Aspect Ratio of 4:1 is required to do so. FIG. 3C indicates that for an Angle-of-Incidence of 65 Degrees, and Aspect Ratio of 2.5:1 is required. These examples are mentioned to show that the Hole in an Aperture can be of any beneficial shape.

Figure 12:
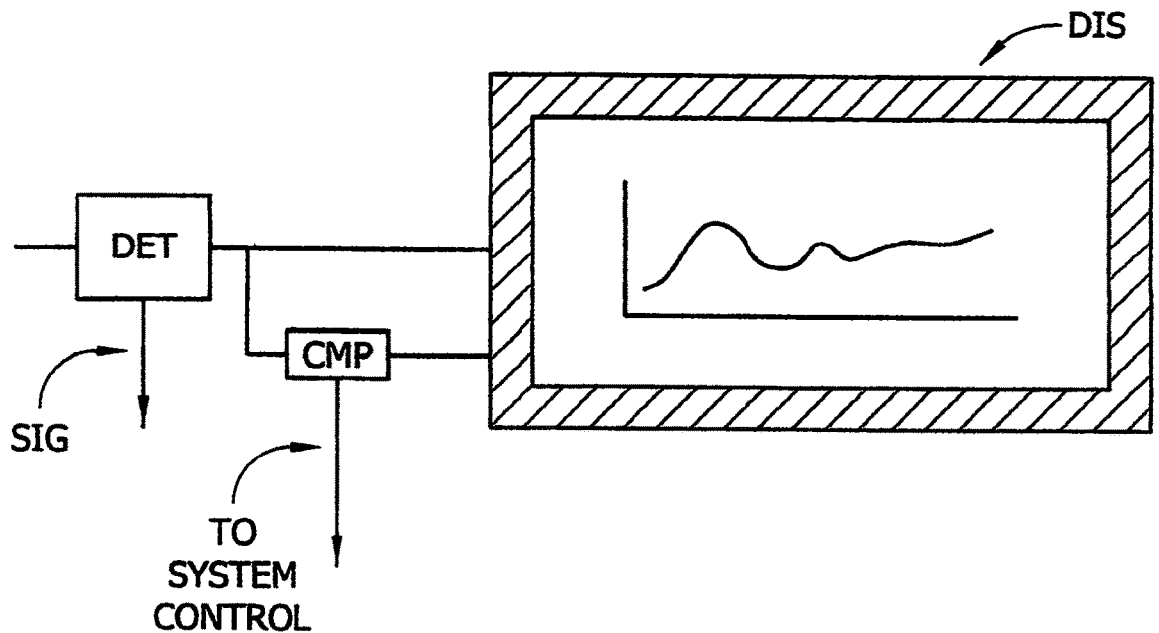
FIG. 12 is included to show that a computer (CMP) can be applied to control the method steps of the present invention.

FIG. 12 is included to show that a computer (CMP) can be applied to control the method steps of the present invention. Note, a signal (SIG) from the Detector (DET) can also be directed to said Computer (CMP), or another computer to analyze data and provide data or analyzed data output.

It is to be appreciated that the language "entry pupil" is often "entrance pupil" in the literature.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

We claim:

1. An ellipsometer system comprising an oblique angle imaging system for viewing a sample, which imaged sample presents with a sufficiently large surface area such that when viewed obliquely at an image detector, image focus varies with location in said image that it is difficult to maintain a focused image over an extent of said surface and simultaneously correct for keystone error in said image;

said ellipsometer system comprising:
a source of a sample investigating beam of electromagnetic radiation;
a stage for supporting a sample placed there upon, upon which is present a sample having a surface; and
a detector;
such that during use an investigating beam of electromagnetic radiation from said source thereof is directed to impinge at an oblique angle onto said sample surface, reflect therefrom and enter said detector;
and said oblique angle imaging system, comprising:

21 a) a source of sample illuminating electromagnetic radiation;
b) said stage for supporting a sample placed thereupon, upon which is present a sample having a surface, said sample having a sufficiently large surface area that, when viewed by an detector at an oblique angle, it is difficult to maintain a focused image over an extent of said surface and simultaneously correct for keystone error in said image;
c) a telecentric lens system sequentially comprising:
   at least one lens;
   an aperture having a diameter; and
   at least one lens;
said telecentric lens system being characterized by at least one selection from the group consisting of:
   the entry pupil is substantially at infinity, where "pupil" refers to a selection from the group consisting of:
      object of an aperture; and
      image of an aperture;
   and
   the exit pupil is substantially at infinity, where "pupil" refers to a selection from the group consisting of:
      object of an aperture; and
      image of an aperture;
   and
d) a multi-element imaging detector having an input surface;
said oblique angle imaging system source of illuminating electromagnetic radiation being configured to direct a beam of electromagnetic radiation toward said sample at an oblique angle to its surface;
said multi-element imaging detector being configured to receive electromagnetic radiation from said sample;
said telecentric lens system being positioned between said sample surface and the input surface of said multi-element imaging detector;
said sample surface, input surface of said imaging detector and telecentric lens being oriented with respect to one another so that the Scheimpflug condition is achieved;
said multi-element imaging detector producing an image of said sample surface which is both substantially in focus, and demonstrates substantially no keystone error;
wherein said source of illuminating electromagnetic radiation provides illuminating electromagnetic radiation over an area on said surface of said sample whereat said sample investigating beam of electromagnetic radiation impinges;
wherein the multi-element imaging detector input surface comprises a camera sensor plate, and said sample imaging system for monitoring the surface of said sample comprises a focusing system;
each of said camera sensor plate, focusing system and sample supporting stage each being oriented in identifiable planes, wherein said planes are configured so that:
   the plane of the camera sensor plate refers to the orientation of its surface;
   the plane of the sample supporting stage refers to the orientation of its surface; and
   the plane of the focusing system is perpendicular to its optical axis;
such that in use when said sample imaging is positioned to observe a sample placed on said stage for supporting a sample long a sample imaging viewpoint locus (VL), said sample imaging viewpoint locus forms an angle alpha ($\alpha$) with respect to the plane of said camera sensor plate, and proceeds from said camera sensor plate along a substantial perpendicular to the plane of said focusing system and along its optical axis, and such that said sample imaging system viewpoint locus further forms an oblique angle of incidence beta ($\beta$) with respect to a normal to a surface of said sample;
said camera sensor plate, focusing system and stage for supporting a sample being oriented with respect to one another such that a projected perpendicular to the plane of the camera sensor plate, a projected plane of the sample surface and a projected plane of the focusing system intersect at a common point, and such that the following condition is substantially met:

$$\text{Tan}(\alpha) = (X-f)/f\, \text{Tan}(\beta);$$

where "X" is the distance from the camera sensor plate, at the point at which said beam passes therethrough, to a center of said focusing system, and "f" is the focal length of said focusing system and where alpha ($\alpha$) and beta ($\beta$) were defined above;
such that, in use the sample imaging system provides a focused view of the sample over the area thereof viewed, while ellipsometer data is acquired at small angles-of-incidence.

2. The ellipsometer system in claim 1, which further comprises at least the first selection from the group consisting of:
   a polarizer/analyzer; and
   a compensator;
between said source of a sample investigating beam of electromagnetic radiation and said detector thereof to enable effecting a polarization state in said sample investigating beam of electromagnetic radiation.

3. An ellipsometer system comprising an oblique angle imaging system for viewing a sample, which imaged sample presents with a sufficiently large surface area such that when viewed obliquely at an image detector, image focus varies with location in said image so that it is difficult to maintain a focused image over an extent of said surface and simultaneously correct for keystone error in said image;
said ellipsometer system comprising:
   a source of a sample investigating beam of electromagnetic radiation;
   a stage for supporting a sample placed there upon, upon which is present a sample having a surface; and
   a detector;
said ellipsometer system source, stage and detector being configured so that said source directs a sample investigating beam of electromagnetic radiation toward said sample placed on said stage of said ellipsometer so that it impinges on a spot thereof, reflects therefrom and enters said detector;
and said oblique angle imaging system, comprising:
   a) a source of sample illuminating electromagnetic radiation;
   b) said stage for supporting a sample placed thereupon, upon which is present a sample, said surface having a sufficiently large surface area that, when viewed by an detector at an oblique angle it is difficult to maintain a focused image over an extent of said surface and simultaneously correct for keystone error in said image;
   c) a telecentric lens system sequentially comprising:
      at least one lens;
      an aperture having a diameter; and
      at least one lens;

said telecentric lens system being characterized by:
  the entry pupil is substantially at infinity, where "pupil" refers to a selection from the group consisting of:
    object of an aperture; and
    image of an aperture;
  and
  the exit pupil is substantially at infinity, where "pupil" refers to a selection from the group consisting of:
    object of an aperture; and
    image of an aperture;
  and
d) a multi-element imaging detector having an input surface;
said oblique angle imaging system source of illuminating electromagnetic radiation being configured to direct a beam of electromagnetic radiation toward said sample at an oblique angle to its surface;
said multi-element imaging detector being configured to receive electromagnetic radiation from said sample;
said telecentric lens system being positioned between said sample surface and the input surface of said multi-element imaging detector;
said sample surface, input surface of said imaging detector and telecentric lens being oriented with respect to one another so that the Scheimpflug condition is achieved;
said multi-element imaging detector producing an image of said sample surface which is both substantially in focus, and demonstrates substantially no keystone error; and
wherein said source of illuminating electromagnetic radiation provides illuminating electromagnetic radiation over an area on said surface of said sample whereat said sample investigating beam of electromagnetic radiation impinges,
wherein the multi-element imaging detector input surface comprises a camera sensor plate, and said sample imaging system for monitoring the surface of said sample comprises a focusing system;
each of said camera sensor plate, focusing system and sample supporting stage each being oriented in identifiable planes, wherein said planes are configured so that:
  the plane of the camera sensor plate refers to the orientation of its surface;
  the plane of the sample supporting stage refers to the orientation of its surface; and
  the plane of the focusing system is perpendicular to its optical axis;
such that in use when said sample imaging is positioned to observe a sample placed on said stage for supporting a sample long a sample imaging viewpoint locus (VL), said sample imaging viewpoint locus forms an angle alpha ($\alpha$) with respect to the plane of said camera sensor plate, and proceeds from said camera sensor plate along a substantial perpendicular to the plane of said focusing system and along its optical axis, and such that said sample imaging system viewpoint locus further forms an oblique angle of incidence beta ($\beta$) with respect to a normal to a surface of said sample;
said camera sensor plate, focusing system and stage for supporting a sample being oriented with respect to one another such that a projected perpendicular to the plane of the camera sensor plate, a projected plane of the sample surface and a projected plane of the focusing system intersect at a common point, and such that the following condition is substantially met:

$$\text{Tan}(\alpha) = (X-f)/f \, \text{Tan}(\beta);$$

where "X" is the distance from the camera sensor plate, at the point at which said beam passes therethrough, to a center of said focusing system, and "f" is the focal length of said focusing system and where alpha ($\alpha$) and beta ($\beta$) were defined above;
such that, in use the sample imaging system provides a focused view of the sample over the area thereof viewed, while ellipsometer data is acquired at small angles-of-incidence.

4. The ellipsometer system in claim 3, which further comprises at least the first selection from the group consisting of:
  a polarizer/analyzer; and
  a compensator;
between said source of a sample investigating beam of electromagnetic radiation and said detector thereof, to enable effecting a polarization state in said sample investigating beam of electromagnetic radiation.

5. The ellipsometer system in claim 3, wherein the source of illuminating electromagnetic radiation and the source of sample investigating electromagnetic radiation are derived from a common source of electromagnetic radiation.

6. The ellipsometer system for viewing a sample in claim 3, in which said aperture diameter is adjustable.

7. The ellipsometer system for viewing a sample in claim 3, in which the oblique angle of said illuminating electromagnetic radiation is at, or near the Brewster angle for the sample being investigated.

8. A method of imaging and investigating a sample with electromagnetic radiation comprising the steps of:
  a) providing an ellipsometer system comprising an oblique angle imaging system for viewing a sample, which imaged sample presents with a sufficiently large surface area such that when viewed obliquely at an image detector, image focus varies with location in said image so that it is difficult to maintain a focused image over an extent of said surface and simultaneously correct for keystone error in said image;
  said ellipsometer system comprising:
    a source of a sample investigating beam of electromagnetic radiation;
    a stage for supporting a sample placed there upon, upon which is present a sample having a surface; and
    a detector;
  said ellipsometer system source, stage and detector being configured so that said source directs a sample investigating beam of electromagnetic radiation to said sample placed on said stage of said ellipsometer so that it impinges on a spot thereof, interacts therewith and enters said detector;
  and providing an oblique angle imaging system, comprising:
    a source of sample illuminating electromagnetic radiation;
    said stage for supporting a sample placed thereupon, upon which is present a sample having a surface, said surface having a sufficiently large surface area that, when viewed by a detector at an oblique angle it is difficult to maintain a focused image over an extent of said surface and simultaneously correct for keystone error in said image;
    a telecentric lens system sequentially comprising:
      at least one lens;
      an aperture having a diameter; and
      at least one lens;

said telecentric lens system being characterized by:
  the entry pupil is substantially at infinity, where "pupil" refers to a selection from the group consisting or:
    object of an aperture; and
    image of an aperture;
  and
  the exit pupil is substantially at infinity, where "pupil" refers to a selection from the group consisting of:
    object of an aperture; and
    image of an aperture;
  and
  a multi-element imaging detector having an input surface;
said oblique angle imaging system source of illuminating electromagnetic radiation being configured to direct a beam of electromagnetic radiation toward said sample at an oblique angle to its surface;
said multi-element imaging detector being configured to receive electromagnetic radiation from said sample;
said telecentric lens system being positioned between said sample surface and the input surface of said multi-element imaging detector;
said multi-element imaging detector producing an image of said sample surface which is both substantially in focus, and demonstrates substantially no keystone error;
wherein said source of illuminating electromagnetic radiation provides illuminating electromagnetic radiation over an area on said surface of said sample whereat said sample investigating beam of electromagnetic radiation impinges;
wherein the multi-element imaging detector input surface comprises a camera sensor plate, and said sample imaging system for monitoring the surface of said sample comprises a focusing system;
each of said camera sensor plate, focusing system and sample supporting stage each being oriented in identifiable planes, wherein said planes are configured so that:
  the plane of the camera sensor plate refers to the orientationof its surface;
  the plane of the sample supporting stage refers to the orientation of its surface; and
  the plane of the focusing system is perpendicular to its optical axis;
such that in use when said sample imaging is positioned to observe a sample placed on said stage for supporting a sample along a sample imaging viewpoint locus (VL), said sample imaging viewpoint locus forms an angle alpha ($\propto$) with respect to the plane of said camera sensor plate, and proceeds from said camera sensor plate along a substantial perpendicular to the plane of said focusing system and along its optical axis, and such that said sample imaging system viewpoint locus further forms an oblique angle of incidence beta ($\beta$) with respect to a normal to a surface of said sample;
said camera sensor plate, focusing system and stage for supporting a sample being oriented with respect to one another such that a projected perpendicular to the plane of the camera sensor plate, a projected plane of the sample surface and a projected plane of the focusing system intersect at a common point, and such that the following condition is substantially met:

$$\operatorname{Tan}(\propto) = (X-f)/f \operatorname{Tan}(\beta);$$

where "X" is the distance from the camera sensor plate, at the point at which said beam passes therethrough, to a center of said focusing system, and "f" is the focal length of said focusing system and where alpha ($\propto$) and beta ($\beta$) were defined above;
such that, in use the sample imaging system provides a focused view of the sample over the area thereof viewed, while ellipsometer data is acquired at small angles-of-incidence;
said method further comprising:
  b) orienting said sample surface and multi-element imaging detector surface to meet the Scheimpflug condition in conjunction with said telecentric lens system between said sample surface and multi-element imaging detector surface so that, an image of said sample surface when produced by said multi-element imaging detector, demonstrates substantially no keystone error and said image is substantially in focus over its entire extent;
  c) causing said source of illuminating electromagnetic radiation to direct illuminating electromagnetic radiation to reflect from said sample surface at an oblique angle, pass through said telecentric lens system and enter said multi-element imaging detector;
  d) causing said multi-element imaging detector to produce an image of said sample surface that is substantially free of keystone error and is substantially in focus.

9. The method of claim 8, which further comprises providing a computer and practicing at least one selection from the group consisting of:
  steps c) and d) are carried out under control thereof; and
  the method includes storing at least some output provided by the multi-element imaging detector in a non-transitory machine readable media, and analyzing at least some output provided thereby.

10. The method of claim 9, in which said computer receives data from said multi-element imaging detector and corrects it for image aspect ratio prior to displaying it.

11. The method of claim 8, in which the system further comprises at least the first selection from the group consisting of:
  a polarizer/analyzer; and
  a compensator;
between said source of a sample investigating beam of electromagnetic radiation and said detector thereof, to enable effecting a polarization state in said sample investigating beam of electromagnetic radiation.

12. The method of claim 8, where step c) involves causing said source of illuminating electromagnetic radiation to direct illuminating electromagnetic radiation to reflect from said sample surface at the Brewster angle of the sample being investigated.

13. An ellipsometer system also comprising an oblique angle imaging system for viewing a sample, said ellipsometer system comprising:
  a source of a sample investigating beam of electromagnetic radiation;
  a stage for supporting a sample placed there upon,
    upon which is present a sample having a surface; and
  a detector;
said ellipsometer system source, stage and detector being configured so that said source directs a sample investigating beam of electromagnetic radiation to said sample placed on said stage of said ellipsometer so that it reflects from a spot thereon, and enters said detector;
and providing an oblique angle imaging system, comprising:

a source of sample illuminating electromagnetic radiation;
said stage for supporting a sample placed thereupon, upon which is present a sample having a surface, said surface having a sufficiently large surface area that, when viewed by a detector at an oblique angle, at least one location in said image is observably focused differently than another location;
a telecentric lens system sequentially comprising:
  at least one lens;
  an aperture having a diameter; and
  at least one lens;
and
  a multi-element imaging detector having an input surface;
said oblique angle imaging system source of illuminating electromagnetic radiation being configurable to direct a beam of electromagnetic radiation toward said sample at an oblique angle to its surface;
said multi-element imaging detector being configurable to receive electromagnetic radiation from said sample;
said telecentric lens system being positioned between said sample surface and the input surface of said multi-element imaging detector so that said sample surface, input surface of said imaging detector and telecentric lens can be oriented with respect to one another so that the Scheimpflug condition is achieved therebetween, so that said multi-element imaging detector produces an image of said sample surface which is both substantially in focus, and demonstrates substantially no keystone error;
wherein said source of illuminating electromagnetic radiation provides illuminating electromagnetic radiation over an area on said surface of said sample including whereat said sample investigating beam of electromagnetic radiation impinges;
wherein the multi-element imaging detector input surface comprises a camera sensor plate, and said sample imaging system for monitoring the surface of said sample comprises a focusing system;
each of said camera sensor plate, focusing system and sample supporting stage each being oriented in identifiable planes, wherein said planes are configured so that:
  the plane of the camera sensor plate refers to the orientation of its surface;
  the plane of the sample supporting stage refers to the orientation of its surface; and
  the plane of the focusing system is perpendicular to its optical axis;
such that in use when said sample imaging is positioned to observe a sample placed on said stage for supporting a sample along a sample imaging viewpoint locus (VL), said sample imaging viewpoint locus forms an angle alpha ($\alpha$) with respect to the plane of said camera sensor plate, and proceeds from said camera sensor plate along a substantial perpendicular to the plane of said focusing system and along its optical axis, and such that said sample imaging system viewpoint locus further forms an oblique angle of incidence beta ($\beta$) with respect to a normal to a surface of said sample;
said camera sensor plate, focusing system and stage for supporting a sample being oriented with respect to one another such that a projected perpendicular to the plane of the camera sensor plate, a projected plane of the sample surface and a projected plane of the focusing system intersect at a common point, and such that the following condition is substantially met:

$\text{Tan}(\alpha) = (X-f)/f \, \text{Tan}(\beta);$ where "X" is the distance from the camera sensor plate, at the point at which said beam passes therethrough, to a center of said focusing system, and "f" is the focal length of said focusing system and where alpha ($\alpha$) and beta ($\beta$) were defined above;
such that, in use the sample imaging system provides a focused view of the sample over the area thereof viewed, while ellipsometer data is acquired at small angles-of-incidence.

14. A reflectometer, spectrophotometer, or polarimeter system comprising an oblique angle imaging system for viewing a sample, which imaged sample presents with a sufficiently large surface area such that when viewed obliquely at an image detector, image focus varies with location in said image sufficiently that it is difficult to maintain a focused image over an extent of said surface and simultaneously correct for keystone error in said image;
said reflectometer, spectrophotometer or polarimeter system comprising:
  a source of a sample investigating beam of electromagnetic radiation;
  a stage for supporting a sample placed there upon, upon which is present a sample having a surface; and
  a detector;
such that during use an investigating beam of electromagnetic radiation from said source thereof is directed to impinge at an oblique angle onto said sample surface, reflect therefrom and enter said detector;
and said oblique angle imaging system, comprising:
  a) a source of sample illuminating electromagnetic radiation illumination;
  b) said stage for supporting a sample placed thereupon, upon which is present a sample having a surface, said sample having a sufficiently large surface area that, when viewed by an detector at an oblique angle it is difficult to maintain a focused image over an extent of said surface and simultaneously correct for keystone error in said image;
  c) a telecentric lens system sequentially comprising:
    at least one lens;
    an aperture having a diameter; and
    at least one lens;
  said telecentric lens system being characterized by at least one selection from the group consisting of:
    the entry pupil is substantially at infinity, where "pupil" refers to a selection from the group consisting of:
      object of an aperture; and
      image of an aperture;
    and
    the exit pupil is substantially at infinity, where "pupil" refers to a selection from the group consisting of:
      object of an aperture; and
      image of an aperture;
  and
  d) a multi-element imaging detector having an input surface;
  said oblique angle imaging system source of illuminating electromagnetic radiation being configured to direct a beam of electromagnetic radiation toward said sample at an oblique angle to its surface;
  said multi-element imaging detector being configured to receive electromagnetic radiation from said sample;
  said telecentric lens system being positioned between said sample surface and the input surface of said multi-element imaging detector;

said sample surface, input surface of said imaging detector and telecentric lens being oriented with respect to one another so that the Scheimpflug condition is achieved;

said multi-element imaging detector producing an image of said sample surface which is both substantially in focus, and demonstrates substantially no keystone error;

wherein said source of illuminating electromagnetic radiation provides illuminating electromagnetic radiation over an area on said surface of said sample including whereat said sample investigating beam of electromagnetic radiation impinges;

wherein the multi-element imaging detector input surface comprises a camera sensor plate, and said sample imaging system for monitoring the surface of said sample comprises a focusing system;

each of said camera sensor plate, focusing system and sample supporting stage each being oriented in identifiable planes, wherein said planes are configured so that:

the plane of the camera sensor plate refers to the orientation of its surface;

the plane of the sample supporting stage refers to the orientation of its surface; and the plane of the focusing system is perpendicular to its optical axis;

such that in use when said sample imaging is positioned to observe a sample placed on said stage for supporting a sample along a sample imaging viewpoint locus (VL), said sample imaging viewpoint locus forms an angle alpha ($\propto$) with respect to the plane of said camera sensor plate, and proceeds from said camera sensor plate along a substantial perpendicular to the plane of said focusing system and along its optical axis, and such that said sample imaging system viewpoint locus further forms an oblique angle of incidence beta ($\beta$) with respect to a normal to a surface of said sample;

said camera sensor plate, focusing system and stage for supporting a sample being oriented with respect to one another such that a projected perpendicular to the plane of the camera sensor plate, a projected plane of the sample surface and a projected plane of the focusing system intersect at a common point, and such that the following condition is substantially met:

$\text{Tan}(\propto) = (X-f)/f \, \text{Tan}(\beta)$;

where "X" is the distance from the camera sensor plate, at the point at which said beam passes therethrough, to a center of said focusing system, and "f" is the focal length of said focusing system and where alpha ($\propto$) and beta ($\beta$) were defined above;

such that, in use the sample imaging system provides a focused view of the sample over the area thereof viewed, while reflectometer, spectrophotometer or polarimeter data is acquired at small angles-of-incidence.

15. A method of imaging and investigating a sample with electromagnetic radiation comprising the steps of:

a) providing a reflectometer, spectrophotometer or polarimeter system comprising an oblique angle imaging system for viewing a sample, which imaged sample presents with a sufficiently large surface area such that when viewed obliquely at an image detector, image focus varies with location in said image so that it is difficult to maintain a focused image over an extent of said surface and simultaneously correct for keystone error in said image;

said reflectometer, spectrophotometer or polarimeter system comprising:

a source of a sample investigating beam of electromagnetic radiation;

a stage for supporting a sample placed there upon, upon which is present a sample having a surface; and a detector;

said reflectometer, spectrophotometer or polarimeter system source, stage and detector being configured so that said source directs a sample investigating beam of electromagnetic radiation to said sample placed on said stage of said reflectometer, spectrophotometer or polarimeter so that it impinges on a spot thereof, interacts therewith and enters said detector;

and providing an oblique angle imaging system, comprising:

a source of sample illuminating electromagnetic radiation;

said stage for supporting a sample placed thereupon, upon which is present a sample having a surface, said surface having a sufficiently large surface area that, when viewed by a detector at an oblique angle it is difficult to maintain a focused image over an extent of said surface and simultaneously correct for keystone error in said image;

a telecentric lens system sequentially comprising:
at least one lens;
an aperture having a diameter; and
at least one lens;

said telecentric lens system being characterized by:

the entry pupil is substantially at infinity, where "pupil" refers to a selection from the group consisting of:
object of an aperture; and
image of an aperture;

and the exit pupil is substantially at infinity, where "pupil" refers to a selection from the group consisting of:
object of an aperture; and
image of an aperture;

and a multi-element imaging detector having an input surface;

said oblique angle imaging system source of illuminating electromagnetic radiation being configured to direct a beam of electromagnetic radiation toward said sample at an oblique angle to its surface;

said multi-element imaging detector being configured to receive electromagnetic radiation from said sample;

said telecentric lens system being positioned between said sample surface and the input surface of said multi-element imaging detector;

said multi-element imaging detector producing an image of said sample surface which is both substantially in focus, and demonstrates substantially no keystone error;

wherein said source of illuminating electromagnetic radiation provides illuminating electromagnetic radiation over an area on said surface of said sample whereat said sample investigating beam of electromagnetic radiation impinges;

wherein the multi-element imaging detector input surface comprises a camera sensor plate, and said sample imaging system for monitoring the surface of said sample comprises a focusing system;

each of said camera sensor plate, focusing system and sample supporting stage each being oriented in identifiable planes,
wherein said planes are configured so that:
  the plane of the camera sensor plate refers to the orientation of its surface;
  the plane of the sample supporting stage refers to the orientation of its surface; and
  the plane of the focusing system is perpendicular to its optical axis;
such that in use when said sample imaging is positioned to observe a sample placed on said stage for supporting a sample along a sample imaging viewpoint locus (VL), said sample imaging viewpoint locus forms an angle alpha ($\propto$) with respect to the plane of said camera sensor plate, and proceeds from said camera sensor plate along a substantial perpendicular to the plane of said focusing system and along its optical axis, and such that said sample imaging system viewpoint locus further forms an oblique angle of incidence beta ($\beta$) with respect to a normal to a surface of said sample;
said camera sensor plate, focusing system and stage for supporting a sample being oriented with respect to one another such that a projected perpendicular to the plane of the camera sensor plate, a projected plane of the sample surface and a projected plane of the focusing system intersect at a common point, and such that the following condition is substantially met:

$$\mathrm{Tan}\,(\propto) = (X-f)/f\,\mathrm{Tan}\,(\beta);$$

where "X" is the distance from the camera sensor plate, at the point at which said beam passes therethrough, to a center of said focusing system, and "f" is the focal length of said focusing system and where alpha ($\propto$) and beta ($\beta$) were defined above;
such that, in use the sample imaging system provides a focused view of the sample over the area thereof viewed, while reflectometer, spectrophotometer or polarimeter data is acquired at small angles-of-incidence;
said method further comprising:
  b) orienting said sample surface and multi-element imaging detector surface to meet the Scheimpflug condition in conjunction with said telecentric lens system between said sample surface and multi-element imaging detector surface so that, an image of said sample surface when produced by said multi-element imaging detector, demonstrates substantially no keystone error and said image is substantially in focus over its entire extent;
  c) causing said source of illuminating electromagnetic radiation to direct illuminating electromagnetic radiation to reflect from said sample surface at an oblique angle, pass through said telecentric lens system and enter said multi-element imaging detector;
  d) causing said multi-element imaging detector to produce an image of said sample surface that is substantially free of keystone error and is substantially in focus.

* * * * *